United States Patent
Zhang et al.

(10) Patent No.: US 12,219,398 B2
(45) Date of Patent: Feb. 4, 2025

(54) TECHNIQUES FOR OPERATING IN ACCORDANCE WITH A DUAL NETWORKING MODE FOR STEERING, SWITCHING AND SPLITTING TRAFFIC

(71) Applicant: QUALCOMM Incorporated, San Diego, CA (US)

(72) Inventors: Danlu Zhang, San Diego, CA (US); Dario Serafino Tonesi, San Diego, CA (US); Amer Catovic, San Diego, CA (US); Stefano Faccin, San Ysidro, CA (US); Waqar Zia, Munich (DE); Peng Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/568,043

(22) Filed: Jan. 4, 2022

(65) Prior Publication Data
US 2023/0217310 A1    Jul. 6, 2023

(51) Int. Cl.
*H04W 28/12*        (2009.01)
*H04B 17/309*       (2015.01)
(Continued)

(52) U.S. Cl.
CPC .......... *H04W 28/12* (2013.01); *H04B 17/309* (2015.01); *H04W 24/08* (2013.01);
(Continued)

(58) Field of Classification Search
CPC ..... H04W 28/12; H04W 24/08; H04W 24/10; H04W 28/0236; H04W 64/006;
(Continued)

(56) References Cited

U.S. PATENT DOCUMENTS

2012/0127955 A1*  5/2012  Gandham ....... H04W 36/00837
                                                    370/331
2017/0331569 A1* 11/2017  Van Der Velde ..........................
                                                    H04W 36/1446
2020/0404540 A1   12/2020 Kerpez

FOREIGN PATENT DOCUMENTS

CN        113329413 A      8/2021
WO     WO-2021257974 A1   12/2021

OTHER PUBLICATIONS

International Search Report and Written Opinion—PCT/US2022/080128—ISA/EPO—Feb. 24, 2023 (2104451WO).

\* cited by examiner

*Primary Examiner* — Mang Hang Yeung
(74) *Attorney, Agent, or Firm* — Holland & Hart LLP/Qualcomm

(57) ABSTRACT

Methods, systems, and devices for wireless communications are described. A user equipment (UE) may monitor one or more first conditions pertaining to non-cellular communications between the UE and a non-cellular network while the UE is operating in a dual networking mode for steering, switching, or splitting traffic (e.g., an access traffic steering, switching, and splitting (ATSSS) mode) between the non-cellular network and a cellular network. The UE may predict an availability status of at least the non-cellular network based on at least one of the one or more first conditions. In some cases, the UE may determine whether to change dual networking modes based on the availability status and may communicate in accordance with the same or a different dual networking mode using at least one of the cellular network, the non-cellular network, or a combination thereof based on the prediction.

26 Claims, 16 Drawing Sheets

(51) Int. Cl.
*H04W 24/08* (2009.01)
*H04W 24/10* (2009.01)
*H04W 28/02* (2009.01)
*H04W 64/00* (2009.01)
*H04W 88/06* (2009.01)

(52) U.S. Cl.
CPC ....... *H04W 24/10* (2013.01); *H04W 28/0236* (2013.01); *H04W 64/006* (2013.01); *H04W 88/06* (2013.01)

(58) Field of Classification Search
CPC ............. H04W 88/06; H04W 28/0865; H04W 28/0958; H04W 40/12; H04W 40/18; H04W 40/36; H04B 17/309
USPC ......................................................... 370/436
See application file for complete search history.

TECHNIQUES FOR OPERATING IN ACCORDANCE WITH A DUAL NETWORKING MODE FOR STEERING, SWITCHING AND SPLITTING TRAFFIC

FIELD OF TECHNOLOGY

The following relates to wireless communications, including techniques for operating in accordance with a dual networking mode for steering, switching and splitting traffic.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive communications via one or more networks, such as a non-cellular network, a cellular network, both. The UE may be configured to connect with the one or more networks in accordance with a dual networking mode (e.g., an access traffic steering, switching, and splitting (ATSSS) mode). A dual networking mode may configure how communications are coordinated between the one or more networks. Techniques for utilizing a dual networking mode may be improved.

SUMMARY

The described techniques relate to improved methods, systems, devices, and apparatuses that support techniques for operating in accordance with a dual networking mode for steering, switching and splitting traffic. Generally, the described techniques provide for improved methods of utilizing dual networking modes for steering, switching, or splitting traffic (e.g., access traffic steering, switching, and splitting (ATSSS) modes) by a user equipment (UE) to coordinate communications from multiple networks, such as one or more cellular networks, one or more non-cellular networks (e.g., a WiFi network), or a combination thereof. The described techniques may allow a UE to monitor an availability of one or more of networks the UE is receiving service from. The UE may predict an availability status of one or more of the networks and the UE may adjust dual networking modes based on the availability. Accordingly, the UE may predict that one or more of the networks will become unavailable and adjust modes prior to the unavailability so that communications are unaffected. For example, a UE may monitor one or more first conditions pertaining to non-cellular communications between the UE and a non-cellular network while the UE is operating in a dual networking mode between the non-cellular network and a cellular network. The UE may predict an availability status of at least the non-cellular network based on at least one of the one or more first conditions. In some cases, the UE may determine whether to change dual networking modes based on the availability status and may communicate in accordance with the same or a different dual networking mode using at least one of the cellular network, the non-cellular network, or a combination thereof based on the prediction.

A method for wireless communications at a UE is described. The method may include monitoring one or more first conditions pertaining to non-cellular communications between the UE and a non-cellular network while the UE is operating in a dual networking mode for steering, switching, or splitting traffic between the non-cellular network and a cellular network, predicting an availability status of at least the non-cellular network based on at least one of the one or more first conditions, and communicating in accordance with the dual networking mode using at least one of the cellular network, the non-cellular network, or a combination thereof based on the prediction.

An apparatus for wireless communications at a UE is described. The apparatus may include a processor, memory coupled with the processor, and instructions stored in the memory. The instructions may be executable by the processor to cause the apparatus to monitor one or more first conditions pertaining to non-cellular communications between the UE and a non-cellular network while the UE is operating in a dual networking mode for steering, switching, or splitting traffic between the non-cellular network and a cellular network, predict an availability status of at least the non-cellular network based on at least one of the one or more first conditions, and communicate in accordance with the dual networking mode using at least one of the cellular network, the non-cellular network, or a combination thereof based on the prediction.

Another apparatus for wireless communications at a UE is described. The apparatus may include means for monitoring one or more first conditions pertaining to non-cellular communications between the UE and a non-cellular network while the UE is operating in a dual networking mode for steering, switching, or splitting traffic between the non-cellular network and a cellular network, means for predicting an availability status of at least the non-cellular network based on at least one of the one or more first conditions, and means for communicating in accordance with the dual networking mode using at least one of the cellular network, the non-cellular network, or a combination thereof based on the prediction.

A non-transitory computer-readable medium storing code for wireless communications at a UE is described. The code may include instructions executable by a processor to monitor one or more first conditions pertaining to non-cellular communications between the UE and a non-cellular network while the UE is operating in a dual networking mode for steering, switching, or splitting traffic between the non-cellular network and a cellular network, predict an availability status of at least the non-cellular network based on at least one of the one or more first conditions, and communicate in accordance with the dual networking mode using at least one of the cellular network, the non-cellular network, or a combination thereof based on the prediction.

In some examples of the method, apparatuses, and non-transitory computer-readable medium described herein, predicting the availability status of the non-cellular network may include operations, features, means, or instructions for predicting that the non-cellular network will become unavailable to the UE based on at least one of the one or more first conditions.

Some examples of the method, apparatuses, and non-transitory computer-readable medium described herein may further include operations, features, means, or instructions for transmitting a message indicating that the non-cellular network will become unavailable, the message including a field indicating that the non-cellular network will become unavailable, an indication of a failure event associated with the non-cellular network, a report including one or more parameters associated with the non-cellular network, or a combination thereof.

Some examples of the method, apparatuses, and non-transitory computer-readable medium described herein may further include operations, features, means, or instructions for determining a time to transmit the message indicating that the non-cellular network will become unavailable, the time based on a predicted time that the non-cellular network will become unavailable, where the UE transmits the message at the time.

Some examples of the method, apparatuses, and non-transitory computer-readable medium described herein may further include operations, features, means, or instructions for receiving an indication for the UE to change dual networking modes in response to the message indicating that the non-cellular network will become unavailable, where the indication configures the UE to switch to the cellular network, or configures the UE to switch to a different dual networking mode.

Some examples of the method, apparatuses, and non-transitory computer-readable medium described herein may further include operations, features, means, or instructions for determining to change dual networking modes, where the UE determines to switch to the cellular network, or to switch to a different dual networking mode based on predicting that the non-cellular network will become unavailable.

In some examples of the method, apparatuses, and non-transitory computer-readable medium described herein, communicating may include operations, features, means, or instructions for communicating with the cellular network based on predicting that the non-cellular network will become unavailable to the UE.

Some examples of the method, apparatuses, and non-transitory computer-readable medium described herein may further include operations, features, means, or instructions for predicting a time at which the non-cellular network will become unavailable to the UE.

In some examples of the method, apparatuses, and non-transitory computer-readable medium described herein, monitoring the one or more first conditions may include operations, features, means, or instructions for monitoring signal-to-noise-plus-interference ratio (SINR) measurements at a receiver of the UE for communications with the non-cellular network, a receive-power based on channel occupancy measurements, a signal variation, a channel quality, a radio frequency signature of the non-cellular network, or a combination thereof.

In some examples of the method, apparatuses, and non-transitory computer-readable medium described herein, monitoring the one or more first conditions may include operations, features, means, or instructions for monitoring a Global Navigation Satellite System (GNSS) positioning of the UE, a Bluetooth connection of the UE, an application the UE may be using, a quality of service requirement, or a combination thereof.

In some examples of the method, apparatuses, and non-transitory computer-readable medium described herein, monitoring the GNSS positioning of the UE may include operations, features, means, or instructions for determining whether the UE may be near a cell-edge of the non-cellular network.

In some examples of the method, apparatuses, and non-transitory computer-readable medium described herein, monitoring the Bluetooth connection of the UE may include operations, features, means, or instructions for determining whether the UE may be connected to a vehicle via the Bluetooth connection.

In some examples of the method, apparatuses, and non-transitory computer-readable medium described herein, monitoring the one or more first conditions may include operations, features, means, or instructions for monitoring one or more motion conditions associated with a motion of the UE in relation to the non-cellular network, the one or more motion conditions including whether the UE may be moving, whether the motion may be localized, a type of the motion, whether the motion matches a pattern of the UE, whether the UE matches a behavior expected during an application of the UE, or a combination thereof.

Some examples of the method, apparatuses, and non-transitory computer-readable medium described herein may further include operations, features, means, or instructions for monitoring one or more second conditions pertaining to cellular communications between the UE and the cellular network while the UE may be operating in the dual networking mode and predicting an availability status of the cellular network based on at least one of the one or more second conditions, where communicating in accordance with the dual networking mode may be based on predicting the availability status of the cellular network.

In some examples of the method, apparatuses, and non-transitory computer-readable medium described herein, monitoring the one or more second conditions may include operations, features, means, or instructions for monitoring a throughput, a degree of quality of service satisfaction, a channel quality, an occupancy of a physical downlink control channel, interference measurements, a handover procedure, or a combination thereof associated with the cellular network.

In some examples of the method, apparatuses, and non-transitory computer-readable medium described herein, monitoring the one or more second conditions may include operations, features, means, or instructions for monitoring a channel quality based at least on part on synchronization signal measurements, physical broadcast channel measurements, or a combination thereof.

In some examples of the method, apparatuses, and non-transitory computer-readable medium described herein, monitoring the one or more second conditions may include operations, features, means, or instructions for performing power detection to determine an occupancy of a physical downlink control channel, where the power detection may be indicative of cell loading.

In some examples of the method, apparatuses, and non-transitory computer-readable medium described herein, monitoring the one or more second conditions may include operations, features, means, or instructions for monitoring for a handover from a private network to a public network, or vice versa.

Some examples of the method, apparatuses, and non-transitory computer-readable medium described herein may further include operations, features, means, or instructions for determining whether the UE may be transmitting or receiving on-going traffic with the cellular network, where the one or more second conditions may be based on the determination.

Some examples of the method, apparatuses, and non-transitory computer-readable medium described herein may further include operations, features, means, or instructions for inputting the one or more first conditions, the one or more second conditions, or a combination thereof into one or more algorithms, where the one or more algorithms predicts the availability status of at least one of the cellular network, the non-cellular network, or both.

In some examples of the method, apparatuses, and non-transitory computer-readable medium described herein, the one or more algorithms include a neural network, and the neural network may be trained via online training or offline training.

Some examples of the method, apparatuses, and non-transitory computer-readable medium described herein may further include operations, features, means, or instructions for adjusting the one or more first conditions, or the one or more second conditions for predicting the availability status using the one or more algorithms.

In some examples of the method, apparatuses, and non-transitory computer-readable medium described herein, adjusting the one or more first conditions, or the one or more second conditions may include operations, features, means, or instructions for adjusting a channel quality of the non-cellular network and comparing the adjusted channel quality to a threshold, where the adjusted channel quality may be based on loading of the non-cellular network.

Some examples of the method, apparatuses, and non-transitory computer-readable medium described herein may further include operations, features, means, or instructions for inputting one or more backoff factors into the one or more algorithms based on alerts from a source other than a non-cellular network device.

Some examples of the method, apparatuses, and non-transitory computer-readable medium described herein may further include operations, features, means, or instructions for comparing the one or more first conditions, the one or more second conditions, or a combination thereof to one or more patterns, where the one or more patterns include a radio frequency signature, motion patterns, past results indicative of situations in which the UE went out of coverage of the cellular network or the non-cellular network, or a combination thereof.

In some examples of the method, apparatuses, and non-transitory computer-readable medium described herein, the dual networking mode for steering, switching, or splitting traffic may be an Access Traffic Steering, Switching and Splitting mode.

In some examples of the method, apparatuses, and non-transitory computer-readable medium described herein, the non-cellular network may be a WiFi network.

A method for wireless communications at a base station is described. The method may include receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network, transmitting an indication for the UE to change dual networking modes, where the indication configures the UE to switch to the cellular network, or configures the UE to switch to a different dual networking mode, and communicating with the UE in accordance with the dual networking mode in accordance with the indication.

An apparatus for wireless communications at a base station is described. The apparatus may include a processor, memory coupled with the processor, and instructions stored in the memory. The instructions may be executable by the processor to cause the apparatus to receive, from a UE, a message indicating that a non-cellular network will become unavailable, the base station associated with a cellular network and providing cellular communications to the UE in accordance with a dual networking mode for steering, switching, or splitting traffic between the cellular network and the non-cellular network, transmit an indication for the UE to change dual networking modes, where the indication configures the UE to switch to the cellular network, or configures the UE to switch to a different dual networking mode, and communicate with the UE in accordance with the dual networking mode in accordance with the indication.

Another apparatus for wireless communications at a base station is described. The apparatus may include means for receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network, means for transmitting an indication for the UE to change dual networking modes, where the indication configures the UE to switch to the cellular network, or configures the UE to switch to a different dual networking mode, and means for communicating with the UE in accordance with the dual networking mode in accordance with the indication.

A non-transitory computer-readable medium storing code for wireless communications at a base station is described. The code may include instructions executable by a processor to receive, from a UE, a message indicating that a non-cellular network will become unavailable, the base station associated with a cellular network and providing cellular communications to the UE in accordance with a dual networking mode for steering, switching, or splitting traffic between the cellular network and the non-cellular network, transmit an indication for the UE to change dual networking modes, where the indication configures the UE to switch to the cellular network, or configures the UE to switch to a different dual networking mode, and communicate with the UE in accordance with the dual networking mode in accordance with the indication.

In some examples of the method, apparatuses, and non-transitory computer-readable medium described herein, the message includes a field indicating that the non-cellular network will become unavailable, an indication of a failure event associated with the non-cellular network, a report including one or more parameters associated with the non-cellular network, or a combination thereof.

In some examples of the method, apparatuses, and non-transitory computer-readable medium described herein, the dual networking mode for steering, switching, or splitting traffic may be an Access Traffic Steering, Switching and Splitting mode.

In some examples of the method, apparatuses, and non-transitory computer-readable medium described herein, the non-cellular network may be a WiFi network.

DETAILED DESCRIPTION

Figure 1:
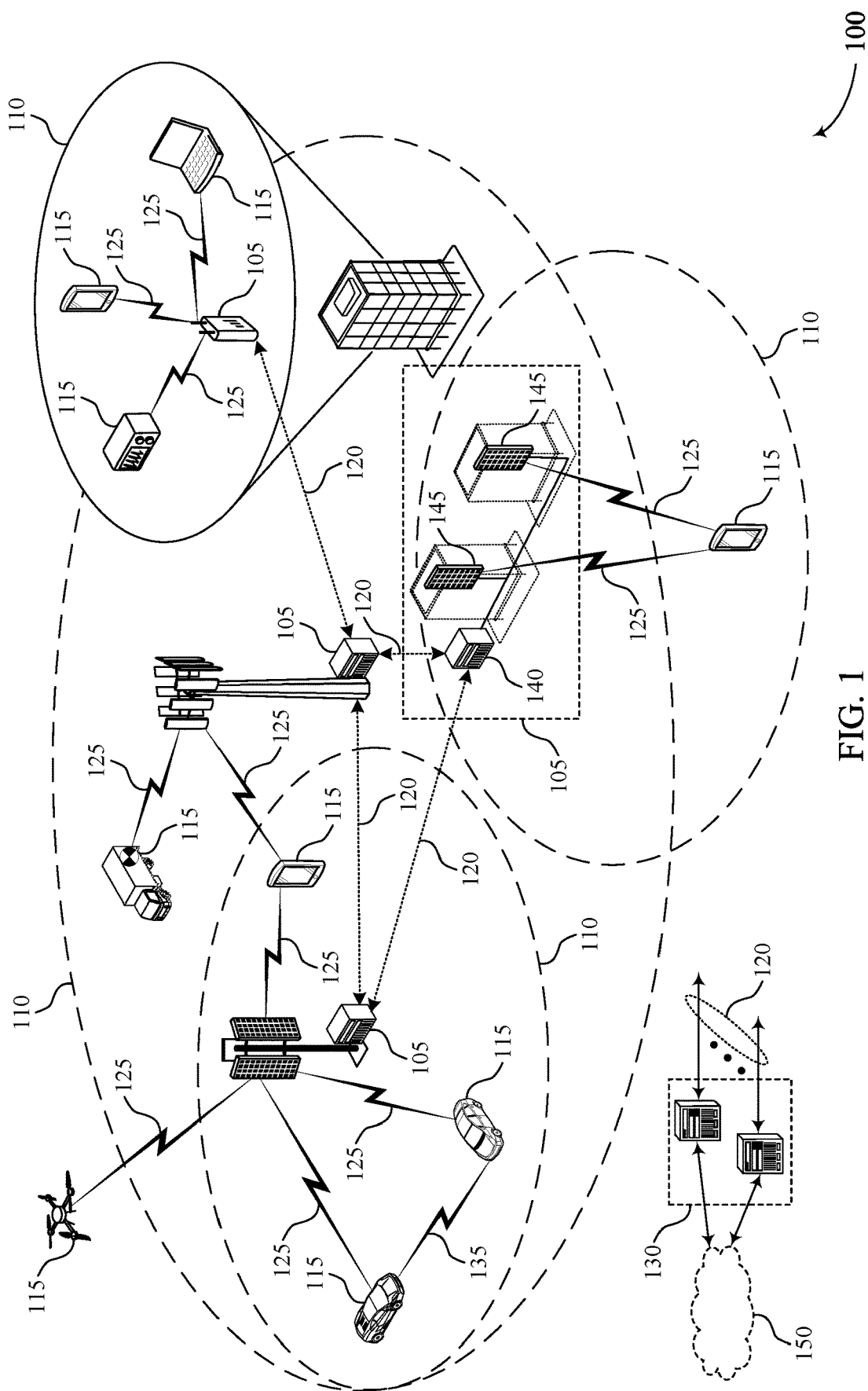
FIG. 1 illustrates an example of a wireless communications system that supports techniques for operating in accordance with a dual networking mode for steering, switching and splitting traffic in accordance with aspects of the present disclosure.

A wireless communications system may include communication devices that may support various access technologies (also referred to as a type of access). Examples of a type of access may include cellular access (e.g., 3GPP access, LTE, LTE-A, LTE-A Pro, or NR), non-cellular access (e.g., non-3GPP access, Wi-Fi, wireline), or a combination thereof. A communication device may support various access combinations for a session. For example, a communication device may use one type of access for wireless communications (e.g., to receive data traffic, transmit data traffic, or a combination thereof), or two types of accesses simultaneously for the wireless communication. The communication device may support ATSSS functionalities (e.g., dual networking functionalities) to distribute the wireless communication (e.g., data traffic) over the two types of accesses for the session (e.g., a multiple access PDU session). Accordingly, a UE may operate in accordance with an ATSSS mode in which uplink and/or downlink traffic of a UE may be served by a cellular network, a non-cellular network (e.g., WiFi), or both (via splitting). Methods for determining the ATSSS mode may be prompted based on a network becoming unavailable. For example, if the UE is receiving traffic split between a WiFi network and a cellular network, and then the UE leaves the coverage area of the WiFi network, the UE would then switch to have the traffic fully serviced by the cellular network. Waiting, however, until a network becomes unavailable to manage the ATSSS mode may introduce latency and decrease reliability for the UE.

To improve ATSSS operation, a UE may be configured to perform techniques for predicting network availability of a cellular network, a non-cellular network, or both, and preemptively taking action so as to reduce latency and improve reliability for the UE. For example, a UE may monitor one or more parameters of the cellular network, such as throughput, degree of quality of service (QoS) satisfaction, channel quality, channel occupancy, etc. The UE may also monitor one or more parameters of the non-cellular network such as receive signal-to-interference-plus-noise ratio (SINR) measurements, etc. and in some cases may monitor one or more parameters of the UE such as the motion of the UE, positioning of the UE, whether the UE is connected to Bluetooth, etc. The UE may input the one or more parameters of the cellular network, the non-cellular network, the UE, or a combination thereof into an algorithm (e.g., a neural network) and the algorithm may predict availability of the networks. If the algorithm predicts that one of the networks may become unavailable (e.g., in the future), the UE may be configured to signal to one or both of the networks that the network is unavailable prior to the network actually becoming unavailable, which may prompt one or both of the networks to adjust the ATSSS mode (e.g., ATSSS steering mode) of the UE accordingly. In some cases, the UE may autonomously adjust the ATSSS mode of the UE based on the prediction.

Particular aspects of the subject matter described herein may be implemented to realize one or more advantages. The described techniques may support improvements in coordinating communications across multiple networks in accordance with ATSSS modes by improving reliability, and decreasing latency, among other advantages. As such, supported techniques may include improved network operations and, in some examples, may promote network efficiencies, among other benefits.

Aspects of the disclosure are initially described in the context of wireless communications systems. Aspects are then described with reference to a dual networking configuration and a process flow. Aspects of the disclosure are further illustrated by and described with reference to apparatus diagrams, system diagrams, and flowcharts that relate to techniques for operating in accordance with a dual networking mode for steering, switching and splitting traffic.

FIG. 1 illustrates an example of a wireless communications system 100 that supports techniques for operating in accordance with a dual networking mode for steering, switching and splitting traffic in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a UE 115 may be configured to support improved methods of utilizing dual networking modes (e.g., ATSSS modes) to coordinate communications from multiple networks (e.g., accesses), such as one or more cellular networks, and one or more non-cellular networks (e.g., a WiFi network). The described techniques may allow a UE 115 to monitor an availability of one or more of networks the UE 115 is receiving service from. The UE 115 may predict an availability status of one or more of the networks and the UE 115 may adjust dual networking modes based on the availability. Accordingly, the UE 115 may predict that one or more of the networks will become unavailable and adjust modes prior to the unavailability so that communications are unaffected. For example, a UE 115 may monitor one or more first conditions pertaining to non-cellular communications between the UE 115 and a non-cellular network while the UE 115 is operating in a dual networking mode (e.g., an ATSSS mode) between the non-cellular network and a cellular network. The UE 115 may predict an availability status of at least the non-cellular network based on at least one of the one or more first conditions. In some cases, the UE 115 may determine whether to change dual networking modes bases on the availability status and may communicate in accordance with the same or a different dual networking mode using at least one of the cellular network, the non-cellular network, or a combination thereof based on the prediction.

Figure 2:
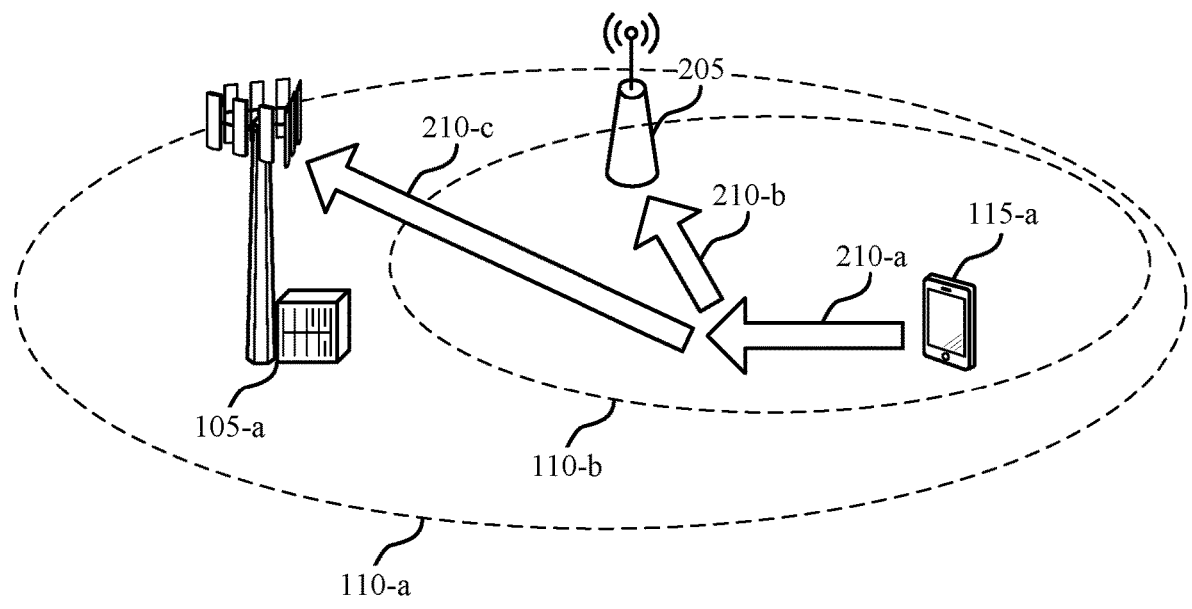
FIG. 2 illustrates an example of a wireless communications system that supports techniques for operating in accordance with a dual networking mode for steering, switching and splitting traffic in accordance with aspects of the present disclosure.

FIG. 2 illustrates an example of a wireless communications system 200 that supports techniques for operating in accordance with a dual networking mode for steering, switching and splitting traffic in accordance with aspects of the present disclosure. The wireless communications system 200 may include base station 105-a, access node 205, and UE 115-a, which may be examples of a base station 105, an access node, and UE 115 as described with reference to FIG. 1. Base station 105-a may serve a geographic coverage area 110-a, and access node 205 may serve geographic coverage area 110-b, where geographic coverage areas 110-a and 110-b may partially overlap, or completely overlap. In some cases, UE 115-*a* may implement a network availability monitoring procedure while operating in accordance with a dual network mode (e.g., an ATSSS mode). Additionally or alternatively, other wireless devices, such as base station 105-*a*, access node 205, or some combination of these devices, may implement a same or similar procedure for monitoring network availability.

Wireless communications system 200 may include communication devices (e.g., base stations 105, access nodes 205, UEs 115) that may support various access technologies (also referred to as a type of access). Examples of a type of access may include cellular access (e.g., 3GPP access, LTE, LTE-A, LTE-A Pro, NR), non-cellular access (e.g., non-3GPP access, Wi-Fi, wireline), or a combination thereof. A communication device may support various access combinations for a session. For example, a communication device may use one type of access for wireless communications (e.g., to receive data traffic, transmit data traffic, or a combination thereof), or two types of accesses simultaneously for the wireless communications. The communication device may support ATSSS functionalities (e.g., dual networking functionalities) to distribute the wireless communication (e.g., data traffic) over the two types of accesses for the session (e.g., a multiple access PDU session).

For example, UE 115-*a* may operate in accordance with an ATSSS mode in which uplink and/or downlink traffic of UE 115-*a* may be served by a cellular network (e.g., base station 105-*a*), a non-cellular network (e.g., WiFi, network, access node 205), or both (via splitting). Accordingly, UE 115-*a* may achieve high throughput by simultaneously being served by base station 105-*a*, and access point 205 in accordance with an ATSSS mode. One example of a scenario in which UE 115-*a* may utilize an ATSSS mode may include UE 115-*a* in an environment in which the UE 115 has access to WiFi (e.g., a home, an office, a library). For example, with reference to FIG. 2, base station 105-*a* may be associated with a cellular network and access node 205 may be associated with a WiFi network, and UE 115-*a* may be connected with both base station 105-*a* and access node 205.

In some cases, methods for determining an ATSSS mode may be prompted based on a network becoming unavailable. For example, if UE 115-*a* is receiving traffic split between base station 105-*a* and access node 205, and then UE 115-*a* leaves geographic coverage area 110-*b* of access node 205, UE 115-*a* may then switch to have the traffic fully serviced by base station 105-*a*. Waiting, however, until a network becomes unavailable to manage the ATSSS mode may introduce latency and decrease reliability for UE 115-*a*.

To improve ATSSS operation, UE 115-*a* may be configured to perform techniques for predicting network availability of a cellular network, a non-cellular network, or both, and may pre-emptively take action so as to reduce latency and improve reliability for UE 115-*a*. Accordingly, UE 115-*a* may be configured to monitor one or more first parameters associated with access node 205, one or more second parameters associated with base station 105-*a*, one or more third parameters associated with UE 115-*a*, or a combination thereof. UE 115-*a* may be configured to anticipate whether one or more of the networks is likely to become unavailable based on the monitored parameters. In the case that UE 115-*a* predicts that one or more of the networks is likely to become unavailable, UE 115-*a*, base station 105-*a*, access node 205, or a combination thereof may prompt UE 115-*a* to change ATSSS modes prior to the unavailability so as to maintain reliable, reduce latency, and mitigate potential impacts on throughput.

The one or more first parameters may include receive signal-to-interference-plus-noise ratio (SINR) measurements, receive power measurements, signal variation, mobility detection of UE 115-*a*, RF signatures, etc. For example, the receiver SINR measurements, the receive power measurements, or both may be based on channel occupancy measurements which may indicate cell loading. In another example, with reference to signal variation, UE 115-*a* and/or a receiver if UE 115-*a* (e.g., a WiFi receiver) may determine whether a receive signal is varying (e.g., at a WiFi receiver of UE 115-*a*). In another example, with reference to RF signatures, UE 115-*a* may determine whether there is a non-cellular RF signature (e.g., WiFi signal RF signature) to compare a non-cellular signal to. If so, UE 115-*a* may determine whether current measurements indicate that the UE is moving out of WiFi coverage. An RF signature may include signal information from the serving access points (e.g., access node 205), other detected access points, or a combination thereof.

The one or more second parameters may be based on whether UE 115-*a* is transmitting and/or receiving on-going communications (e.g., traffic) via base station 105-*a*. In some cases, if UE 115-*a* is transmitting and/or receiving on-going traffic, then the second set of parameters may include throughput, a degree of quality of service (QoS) satisfaction, or both. If UE 115-*a* is not transmitting and/or receiving on-going traffic with base station 105-*a*, then the second set of parameters may include channel quality, channel occupancy, interference measurements, handover procedure, etc. For example, with reference to channel quality, UE 115-*a* may receive one or more of synchronization signals, physical broadcast channel messages, or a combination therefore and perform one or more measurements on the one or more received signals, where the one or more measurements may indicate or otherwise be associated with a channel quality. In another example, with reference to channel occupancy (e.g., PDCCH occupancy), UE 115-*a* may perform power detection which may indicate cell loading. UE 115-*a* may determine an occupancy level of the channel based on the cell loading, power detection, or both. In another example, with reference to handover, UE 115-*a* may determine whether UE 115-*a* has performed a handover procedure to a private cellular network (e.g., a home cellular network, an office cellular network), or a public cellular network. A private cellular network may provide coverage to a limited area, such as a home, or an office and accordingly may allow UE 115-*a* to predict availability of the cellular network, such as in relation to movement of UE 115-*a*.

The one or more third parameters may include motion of UE 115-*a*, positioning of UE 115-*a*, whether UE 115-*a* is connected to Bluetooth, an application being used by UE 115-*a*, QoS, etc. For example, UE 115-*a* may determine whether UE 115-*a* is moving (e.g., via GPS, one or more sensors such as accelerometers, motion sensors, etc.). UE 115-*a* may determine a velocity of the movement, a direction of the movement, etc. If the UE 115-*a* is moving, in some cases, UE 115-*a* may determine a cause of the motion, such as whether the motion is due to an application (e.g., gaming, such as extended reality gaming). For example, UE 115-*a* may determine whether the motion is typical of the motion perceived while gaming, thereby indicating that the UE 115 is likely not moving in a way that will impact network availability. Gaming movement, among other movement types, may not indicate that a UE 115-*a* is leaving a coverage area, and in some cases may not be detected by localized movement. In some cases, UE 115-*a* may determine whether the motion is due to the UE 115 moving around within a house, office, etc., due to the UE 115 leaving the house, the office, etc. Moving around a house, for example, may not indicate that network will become unavailable, whereas motion indicative that UE 115-*a* is leaving the house may indicate that a network, such as the non-cellular network may become unavailable.

In another example, UE 115-*a* may determine a position of UE 115, such as via GNSS positioning (e.g., via a GNSS sensor). UE 115-*a* may determine the position of UE 115-*a* in relation to base station 105-*a*, access node 205, or both. For example, UE 115-*a* may determine whether UE 115-*a* is near a cell edge (e.g., edge of geographic coverage area 110-*a*, edge of geographic coverage area 110-*b*, or both). Nearing or moving around a cell-edge may be indicative that the network associated with the cell-edge that UE 115-*a* is near may become unavailable.

In another example, UE 115-*a* may determine whether UE 115-*a* is connected to one or more other devices via Bluetooth. If so, UE 115-*a* may determine whether the one or more other devices are associated with moving outside of a coverage area. For example, if UE 115-*a* determines that UE 115-*a* is connected via Bluetooth with a gaming headset, UE 115-*a* may determine that UE 115-*a* is likely staying within a coverage area. In another example, if UE 115-*a* determines that UE 115-*a* is connected via Bluetooth with a vehicle, UE 115-*a* may determine that UE 115-*a* is likely in a vehicle and is likely to move outside of a coverage area, such as a coverage area of a non-cellular network (e.g., the coverage area of a home WiFi network).

In another example, UE 115-*a* may identify applications (e.g., operating systems) being run on UE 115-*a*. For example, UE 115-*a* may determine whether the applications are typically associated with remaining in the coverage area of a network, or are typically indicative that UE 115-*a* is leaving a coverage area. For example, UE 115-*a* may identify that UE 115-*a* is running a gaming application, and therefore may determine that UE 115-*a* is likely remaining in the one or more coverage areas (e.g., geographic coverage areas 110-*a*, 110-*b*). In another example, UE 115-*a* may identify that a map application is running which may be indicative that a UE 115-*a* is leaving one or more of geographic coverage areas 110-*a*, and 110-*b*.

In another example, UE 115-*a* may identify a QoS requirement of communications that UE 115-*a* is transmitting and/or receiving. UE 115-*a* may determine a level of importance of maintaining multiple network links (e.g., communications links 210-*a*, 210-*b*, and 210-*c* with base station 105-*a*, and access node 205). For example, UE 115-*a* may determine that to achieve the QoS requirement, UE 115-*a* needs the multiple links.

In some cases, the one or more third parameters may be a subset of the one or more first parameters such that the parameters associated with the non-cellular network in combination with the parameters associated with UE 115-*a* may be used to predict availability of the non-cellular network. Similarly, the one or more third parameters may be a subset of the one or more second parameters such that the parameters associated with the cellular network in combination with the parameters associated with UE 115-*a* may be used to predict availability of the cellular network. In some cases, the one or more first parameters, the one or more second parameters, the one or more third parameters, or a combination thereof may be determined by UE 115-*a*, base station 105-*a*, access node 205, or a combination thereof.

Upon monitoring the one or more first parameters, the one or more second parameters, the one or more third parameters, or a combination thereof, UE 115-*a* may be configured to input the first, second, and/or third set of parameters into one or more algorithms (e.g., neural networks, AI modules, machine-learning modules, a decision engine, a decision synthesizer, an adjustment synthesizer), where the one or more algorithms may predict network availability of base station 105-*a*, access point 205, or both. The one or more algorithms may receive inputs from various heterogenous sources, such as a non-cellular receiver (e.g., a WiFi receiver) of UE 115-*a*, motion sensors, GNSS receivers, Bluetooth modules, OS modules, etc. In some cases, one algorithm may be associated with one set of parameters. For example, UE 115-*a* may be configured with a first algorithm for predicting availability of access node 205 by inputting the first set of parameters and/or the third set of parameters. Accordingly, the first algorithm may predict the availably of access node 205 based on the parameters associated with access node 205 and/or based on the behavior of UE 115-*a* with respect to access node 205. Similarly, UE 115-*a* may be configured with a second algorithm for predicting availability of base station 105-*a* by imputing the second set of parameters, and/or the third set of parameters. Accordingly, the second algorithm may predict the availability of base station 105-*a* based on the parameters associated with base station 105-*a* and/or based on the behavior of UE 115-*a* with respect to base station 105-*a*. In some cases, for channel quality prediction, both a filter-based model (e.g., traditional filter-based mode) and neural network based model may be be used and subject to a selector based on prediction performance.

In some cases, an impact associated with each input may be soft-combined before being input to the algorithm, or while in the algorithm, For example, a WiFi channel quality measurement may be adjusted and in some cases may subject the adjusted WiFi channel quality measurement to a threshold. The adjusted WiFi channel quality may account for loading. In some cases, one or more backoff factors may be added to alerts from sources other than a non-cellular receiver (e.g., the WiFi receiver).

In some implementations, the one or more algorithms may be trained. For example, the one or more algorithms may be trained offline in which patterns and/or behaviors were identified based on other UEs 115 (e.g., generic patterns), studies, other offline methods, and then used to identify an outcome of UE 115-*a* based on a pattern of UE 115-*a* (e.g., a mobility pattern) matching one or more of the generic patterns. In such cases, the generic patterns may be pre-uploaded to a device. In some cases, the one or more algorithms may be trained via online training in which patterns and/or behaviors (e.g., of UE 115-*a*, or other UEs 115) are determined to change overtime and thus are being updated periodically, continuously, etc. In some cases, online training may be used for long-term model parameter adjustments (e.g., developing and/or adjusting an RF signature database), such as if the online training is complex. In some implementations, UE 115-*a* may communicate with base station 105-*a*, access node 205, or both for the purpose of updating the one or more algorithms. Signaling with base station 105-*a* and/or access point 205 may include a range of models used for this purpose, where the signaling may also be introduced for improving CSI feedback in general. Patterns may refer to an RF signature, motion characteristics, situations in the past that resulted in a change in network availability, etc.

In some cases, UE 115-*a*, motion sensors of UE 115-*a*, the one or more algorithms, or a combination thereof may identify whether UE 115-*a* is moving, and identify a cause of identified motion. For example, the motion sensors may determine whether a motion of UE 115-*a* is indicative that UE 115-*a* is likely to move out of coverage of one or more networks. The motion sensors may determine whether motion is detected. If motion is not detected, then the motion sensors may determine that no adjustment is needed for network availability. For example, the motion sensors may determine that UE 115-*a* is likely not moving out of a WiFi network, and therefore, the motion sensors may not adjust the available of the WiFi network from available to unavailable. If, however, motion is detected, then the motion sensors may determine if motion is due to gaming (e.g., due to Bluetooth connection, applications running on UE 115-*a*, motion patters). For example, the motion sensors may compare the detected motion with one or more patterns (e.g., trained patterns, stored patterns, learned patterns) associated with gaming. If the motion is due to gaming, the one or more algorithms may determine that no adjustment is needed for network availability, as UE 115-*a* is likely not moving in a way that impacts network coverage of UE 115-*a*. If, however, motion is not due to gaming, the motion sensors may determine that the motion likely will impact network availability of one or more networks, or may perform one or more other decisions to further determine a cause of the motion.

If the motion sensors determine that the motion of UE 115-*a* will likely impact network availability of the non-cellular network, the cellular network, or both, then the motion sensors may alert an adjustment module (e.g., an adjustment synthesizer, a decision synthesizer, a WiFi adjustment synthesizer, a cellular network adjustment synthesizer). The adjustment module may then determine whether to adjust the availability of one or more networks based on one or more inputs. For example, if a WiFi adjustment synthesizer receives an input that UE 115-*a* is moving and that the motion is not due to gaming, the WiFi adjustment synthesizer may adjust the availability of the WiFi network to unavailable as UE 115-*a* may be moving outside of a coverage area of the WiFi network (e.g., outside of geographic coverage area 110-*b* of access node 205). In some cases, mobility of UE 115-*a* may be more likely to impact the availability of the non-cellular network than the cellular network because UE 115-*a* may be unable to handover to another non-cellular network (e.g., another WiFi network) if the first one becomes unavailable. For example, the UE 115 may move out of range of a home WiFi network, and may be unable to connect to another WiFi network seamlessly because there may not be any public WiFi networks nearby and/or other nearby WiFi networks may be private. In another example, UE 115-*a* may be moving from the coverage of one access point to another access point, where both access points are within a network (e.g., an enterprise network) but the mobility procedure may take time and may result in service outage. However, if a UE 115-*a* moves out of range of a cellular network, the UE 115 may be more likely to perform a handover procedure with another cellular network. In some implementations, the one or more algorithms, the one or more adjustment modules, the motion sensors, or a combination thereof may perform mobility predication of UE 115-*a* based on one or more inputs, such as inputs from a non-cellular receiver (e.g., a WiFi receiver), motion sensors, GNSS receivers, Bluetooth modules, OS modules, etc., where the inputs may include the one or more first, second, and/or third parameters, The one or more algorithms may output a prediction of network availability. For example, if one or more parameters, such as UE mobility, are considered likely to cause UE 115-*a* to fail to receive service from a network, the one or more algorithms may change the status of the impacted network. For example, if UE 115-*a* is likely to move out of geographic coverage area 110-*b*, the one or more algorithms may change the status of the network associated with access node 205 to unavailable. In some implementations, the one or more algorithms may output whether a mobility of UE 115-*a* will likely result in UE 115-*a* moving out of a coverage area 110 of a network, whether network availability will be impacted based on one or more other parameters, or a combination thereof. In some cases, the one or more algorithms may determine whether the availability status of one or more networks will likely change in a certain time period, such as in the next N number of seconds. The one or more algorithms may determine whether it is time to report, or determine a time to report that a network is unavailable based on the prediction that the network will become unavailable.

The one or more algorithms may determine whether to change ATSSS steering modes based on predicted availability. For example, the one or more algorithms may determine whether to adjust priorities assigned to the one or more networks. For example, if the UE 115-*a* is determined to be at home (e.g., firmly within the bounds of a coverage area 110 of a non-cellular network), then the non-cellular network may be given a higher priority over the cellular network. However, if the one or more algorithms predicts a change in availability of the non-cellular network, such as predicting that UE 115-*a* is likely moving out of coverage of the non-cellular network, then the ATSSS mode may assign the cellular network with the higher priority. In another example, if the UE 115-*a* is determined to be at home (e.g., firmly within the bounds of a coverage area 110 of a non-cellular network), then the non-cellular network may be assigned active-standby. However, if the one or more algorithms predicts a change in availability of the non-cellular network, such as predicting that UE 115-*a* is likely moving out of coverage of the non-cellular network, then the ATSSS mode may assign the cellular network with a higher priority, shortest delay, load-balancing, etc.

If one or more of the algorithms predicts that one of the networks may become unavailable (e.g., in the future), UE 115-*a* may be configured to signal to one or both of base station 105-*a* and access node 205, an indication of the unavailable network, prior to the network actually becoming unavailable. In some cases, the signal may indicate that the network is currently unavailable, even if it is not. In some implementations, UE 115-*a* may determine (or be configured) to transmit the signal to both access node 205 and base station 105-*a*, regardless of which network is predicted to become unavailable. In some implementations, UE 115-*a* may determine (or be configured) to transmit the signal to the network that is predicted to become unavailable. For example, if UE 115-*a* predicts that access node 205 will become unavailable, then UE 115-*a* may transmit the signal to access node 205. In some cases, upon receiving the signal, access node 205 may relay a same or similar message to the one or more other networks involved in providing service to UE 115-*a* (e.g., base station 105-*a*). In some implementations, UE 115-*a* may determine (or be configured) to transmit the signal to the network that is predicted to remain available. For example, if UE 115-*a* predicts that access node 205 will become unavailable, then UE 115-*a* may transmit the signal to base station 105-*a*. In some cases, upon receiving the signal, base station 105-*a* may relay a same or similar message to the one or more other networks involved in providing service to UE 115-*a*, such as the network that is predicted to become unavailable (e.g., access node 205).

In some cases, the one or more networks that received the signal may transmit an acknowledgement message back to UE 115-a In some cases, UE 115-a may indicate a time at which one or more of the networks is expected to become unavailable, a duration of time the one or more networks is expected to become unavailable. In some implementations, the signal may indicate additional feedback associated with one or more of the networks. For example, the signal may include an indication of abrupt changes (e.g., a UE 115 in a car, abrupt WiFi signal loss, etc.), a failure event report, a mobility report (e.g., utilizing positioning measurement report).

In some cases, the signal may indicate the network will likely become unavailable, which may prompt one or both of the networks (e.g., access node 205, base station 105-a) to adjust the ATSSS mode (e.g., ATSSS steering mode) of UE 115-a accordingly. In such cases, one or both of the networks may determine to change ATSSS modes for serving UE 115-a and indicate the new ATSSS mode to UE 115-a. In some cases, UE 115-a may autonomously adjust the ATSSS mode of UE 115-a. For example, UE 115-a may autonomously adjust the traffic steering, switching, and/or splitting on the uplink, or adjust the feedback of the downlink channel quality feedback of a cellular and/or non-cellular system. In some cases, UE 115-a may signal the new ATSSS mode to one or more both of the networks. Accordingly, if UE 115-a, access node 205, base station 105-a, or a combination thereof predict that access node 205 will be unavailable to serve UE 115-a (e.g., in the future, such as in a number of seconds, minutes, etc.), UE 115-a may change an ATSSS mode to receive communications solely or primarily from base station 105-a to maintain communication reliability and low latency.

Figure 3:
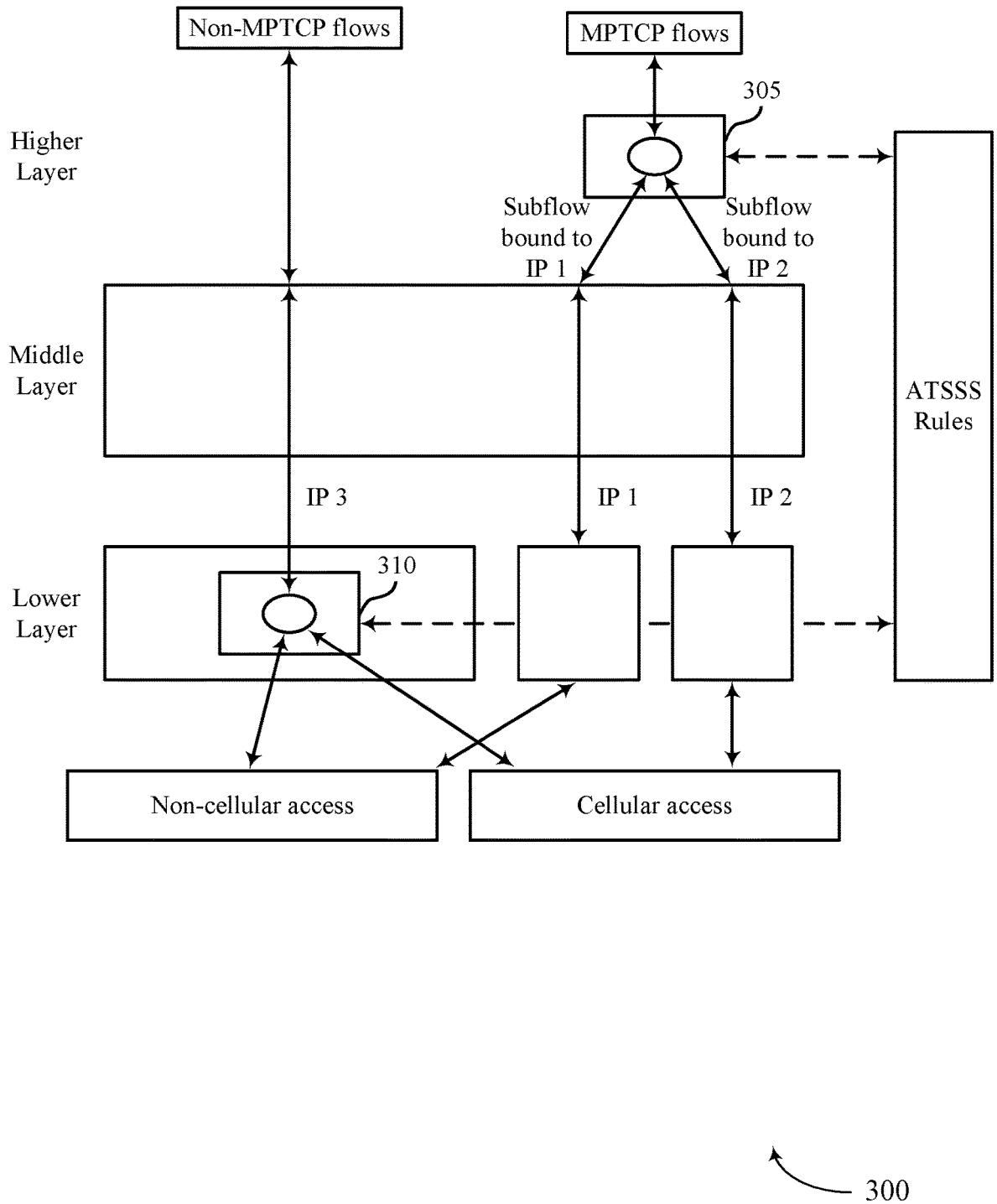
FIG. 3 illustrates an example of a dual networking configuration that supports techniques for operating in accordance with a dual networking mode for steering, switching and splitting traffic in accordance with aspects of the present disclosure.

FIG. 3 illustrates an example of a dual networking configuration 300 that supports techniques for operating in accordance with a dual networking mode for steering, switching and splitting traffic in accordance with aspects of the present disclosure. The dual networking configuration 300 may be implemented by a UE, a base station, an access node, or a combination thereof, which may be examples of the corresponding devices as described with reference to FIGS. 1 and 2. In some cases, a UE may implement a network availability monitoring procedure while operating in accordance with a dual network configuration 300 (e.g., an ATSSS configuration). Additionally or alternatively, other wireless devices, such as a base station, an access node, or some combination of these devices, may implement a same or similar procedure for monitoring network availability.

ATSSS may enable simultaneous cellular and non-cellular (e.g., WiFi) connections at a device, such as a UE, which may offer both upper layer and lower layer control mechanisms. In accordance with ATSSS, Access Traffic Steering may refer to selection of an access network (AN) (e.g., a cellular access network, such as a 3GPP access network, and a non-cellular access, such as a non-3GPP access network) for a new data flow (e.g., IP flows) and transferring the traffic of this data flow over the selected AN. Access Traffic Switching may refer to moving all traffic of an ongoing data flow from one AN to another AN in a way that maintains the continuity of the data flow. Access Traffic Splitting may refer to splitting the traffic of a data flow across multiple ANs. An MA-PDU Session may be established between a UE and network for ATSSS which can exchange PDUs between the UE and the network by simultaneous use of cellular and non-cellular accesses. Uplink traffic over MA-PDU session With reference to communicating uplink traffic, and when uplink resources are available for multiple network accesses, a UE may apply ATSSS rules and consider local conditions (e.g., such as network interface availability, signal loss, user preferences) to determine how to distribute the uplink traffic. With reference to communicating downlink traffic over a MA-PDU session, the UE may provide access availability and/or unavailability reports to the network, such as if requested (e.g., required) by the network (e.g., in the Measurement Assistance Information). In some cases, the ATSSS rules may refer to rules associated with ATSSS modes, such as steering modes (e.g., ATSSS steering modes, AT steering modes). For example, a steering mode may indicate how traffic is to be distributed across multiple accesses. A steering mode may set to active-standby that may include steering a SDF on a first access when the first access is available, and include switching the SDF to a second access when Active access becomes unavailable. Additionally or alternatively, a steering mode may be set to smallest delay that may include steering the SDF to the access that may result in the smallest delay. Additionally or alternatively, a steering mode may be set to load-balancing that may include steering the SDF to accesses so as to balance the load across the access. Additionally or alternatively, a steering mode may be set to priority-based which may include steering all the traffic of an SDF to the access network associated with the higher priority access until the higher priority network becomes congested, for example.

Accordingly, based on an ATSSS mode, a data flow may be split into two flows, each served by a network access. In some cases, the IP flow (e.g., IP 3) may be split in the lower layer by ATSSS-LL functionality 310. In some other cases, an IP flow may be split in a higher layer by MPTCP functionality 305, where the spit may result in multiple IP subflows (e.g., a subflow bound to IP 1, and a subflow bound to IP 2).

Figure 4:
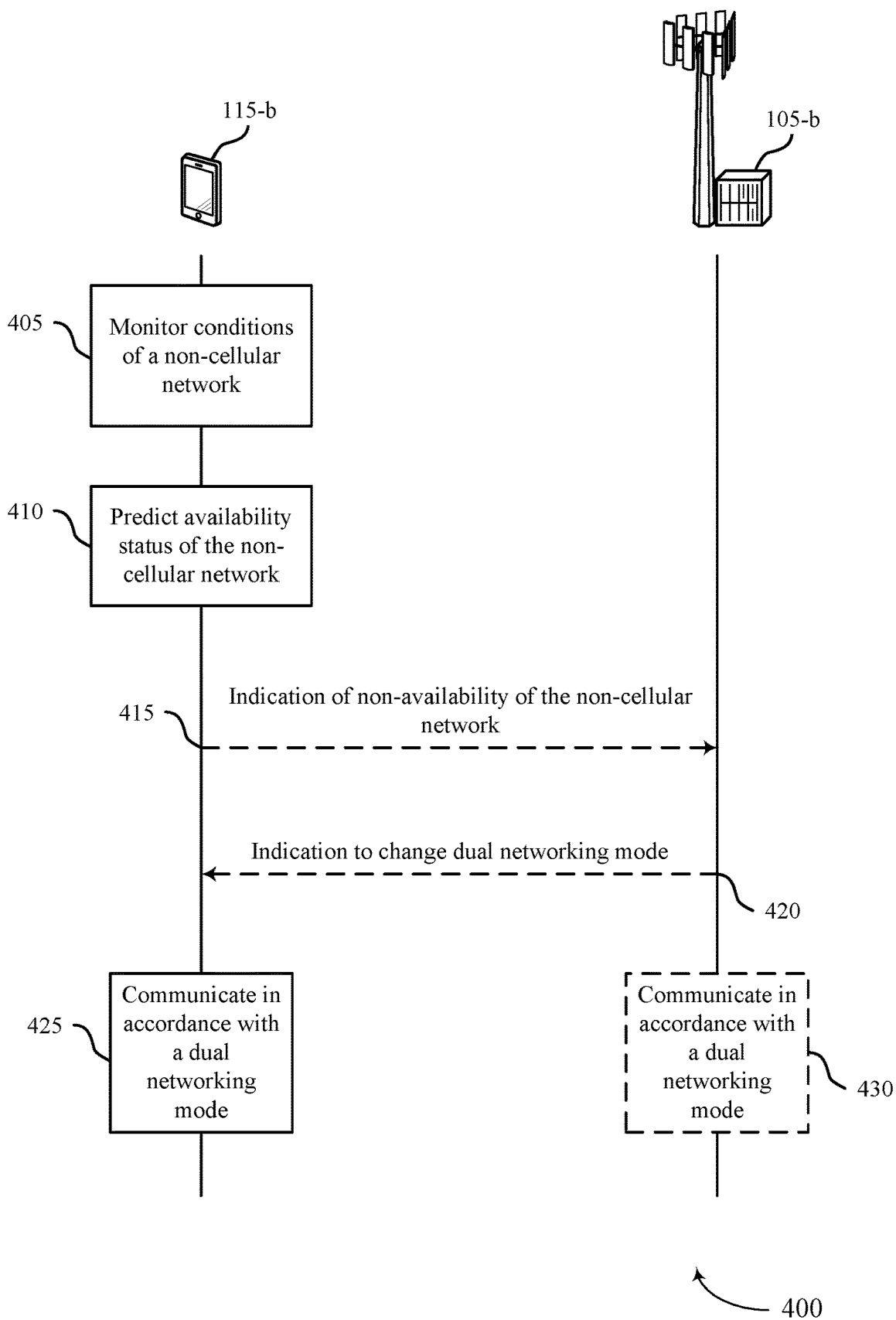
FIG. 4 illustrates an example of a process flow that supports techniques for operating in accordance with a dual networking mode for steering, switching and splitting traffic in accordance with aspects of the present disclosure.

FIG. 4 illustrates an example of a process flow 400 that supports techniques for operating in accordance with a dual networking mode for steering, switching and splitting traffic in accordance with aspects of the present disclosure. The process flow 400 may illustrate an ATSSS communication scheme. For example, UE 115-b may perform a network availability monitoring procedure while operating in accordance with an ATSSS mode. Base station 105-b and UE 115-b may be examples of the corresponding wireless devices described with reference to FIGS. 1 through 3. In some cases, base station 105-b may be cellular access network. In some cases, instead of UE 115-b implementing the network availability monitoring procedure, a different type of wireless device (e.g., a base station 105, an access node) may perform a same or similar procedure. Alternative examples of the following may be implemented, where some steps are performed in a different order than described or are not performed at all. In some cases, steps may include additional features not mentioned below, or further steps may be added.

At 405, UE 115-b may monitor one or more first conditions pertaining to non-cellular communications between UE 115-b and a non-cellular network (e.g., a WiFi network) while the UE is operating in a dual networking mode for steering, switching, or splitting traffic (e.g., ATSSS mode) between the non-cellular network and a cellular network (e.g., base station 105-b). Monitoring the one or more first conditions may include monitoring signal-to-noise-plus-interference ratio (SINR) measurements at a receiver of UE 115-b for communications with the non-cellular network, a receive-power based on channel occupancy measurements, a signal variation, a channel quality, a radio frequency signature of the non-cellular network, or a combination thereof. Monitoring the one or more first conditions may include monitoring a Global Navigation Satellite System (GNSS) positioning of UE 115-*b*, a Bluetooth connection of UE115-*b*, an application UE 115-*b* is using, a quality of service requirement, or a combination thereof. Monitoring the GNSS positioning of UE 115-*b* may include determining whether UE 115-*b* is near a cell-edge of the non-cellular network. Monitoring the Bluetooth connection of UE 115-*b* may include determining whether UE 115-*b* is connected to a vehicle via the Bluetooth connection.

In some cases, monitoring the one or more first conditions may include monitoring one or more motion conditions associated with a motion of UE 115-*b* in relation to the non-cellular network, the one or more motion conditions may include whether UE 115-*b* is moving, whether the motion is localized, a type of the motion, whether the motion matches a pattern of the UE, whether UE 115-*b* matches a behavior expected during an application of UE 115-*b*, or a combination thereof.

At 410, UE 115-*b* may predict an availability status of at least the non-cellular network based on at least one of the one or more first conditions. Predicting the availability status of the non-cellular network may include predicting that the non-cellular network will become unavailable to UE 115-*b* based on at least one of the one or more first conditions. In some cases, UE 115-*b* may predict a time at which the non-cellular network will become unavailable to UE 115-*b*.

In some implementations, UE 115-*b* may monitor one or more second conditions pertaining to cellular communications between UE 115-*b* and the cellular network (e.g., base station 105-*b*) while UE 115-*b* is operating in the dual networking mode, and may predict an availability status of the cellular network based on at least one of the one or more second conditions. Monitoring the one or more second conditions may include monitoring a throughput, a degree of quality of service satisfaction, a channel quality, an occupancy of a physical downlink control channel, interference measurements, a handover procedure, or a combination thereof associated with the cellular network. Monitoring the one or more second conditions may include monitoring a channel quality based at least on part on synchronization signal measurements, physical broadcast channel measurements, or a combination thereof. Monitoring the one or more second conditions may include performing power detection to determine an occupancy of a physical downlink control channel, where the power detection is indicative of cell loading. Monitoring the one or more second conditions may include monitoring for a handover from a private network to a public network, or vice versa.

UE 115-*b* may determine whether UE 115-*b* is transmitting or receiving on-going traffic with the cellular network, where the one or more second conditions that UE 115-*b* monitors are based on the determination.

In some implementations, UE 115-*b* may input the one or more first conditions, the one or more second conditions, or a combination thereof into one or more algorithms, where the one or more algorithms may predict the availability status of at least one of the cellular network, the non-cellular network, or both. The one or more algorithms may include a neural network, and the neural network may be trained via online training or offline training. UE 115-*b* may adjust the one or more first conditions, or the one or more second conditions for predicting the availability status using the one or more algorithms. Adjusting the one or more first conditions, or the one or more second conditions may include adjusting a channel quality of the non-cellular network and comparing the adjusted channel quality to a threshold, where the adjusted channel quality may be based on loading of the non-cellular network. In some cases, UE 115-*a* may input one or more backoff factors into the one or more algorithms based on alerts from a source other than a non-cellular network device. UE 115-*b* may compare the one or more first conditions, the one or more second conditions, or a combination thereof to one or more patterns, where the one or more patterns may include a radio frequency signature, motion patterns, past results indicative of situations in which UE 115-*b* went out of coverage of the cellular network or the non-cellular network, or a combination thereof.

In some cases, at 415, UE 115-*a* may transmit a message indicating that the non-cellular network will become unavailable, where the message may include a field indicating that the non-cellular network will become unavailable, an indication of a failure event associated with the non-cellular network, a report including one or more parameters associated with the non-cellular network, or a combination thereof. In some cases, the report may be an access availability and/or access unavailability report. In some cases, UE 115-*b* may determine a time to transmit the message indicating that the non-cellular network will become unavailable, where the time may be based on a predicted time that the non-cellular network will become unavailable, where the UE transmits the message at the time.

In some case, at 420, UE 115-*b* may receive an indication for UE 115-*b* to change dual networking modes in response to the message indicating that the non-cellular network will become unavailable, where the indication may configure UE 115-*b* to switch to the cellular network, or may configure UE 115-*b* to switch to a different dual networking mode.

In some cases, UE 115-*b* may determine to change dual networking modes, where the UE determines to switch to the cellular network, or to switch to a different dual networking mode based on predicting that the non-cellular network will become unavailable.

At 425, UE 115-*b* may communicate in accordance with the dual networking mode using at least one of the cellular network, the non-cellular network, or a combination thereof based on the prediction. Communicating may include communicating with the cellular network based on predicting that the non-cellular network will become unavailable to UE 115-*b*. Communicating in accordance with the dual networking mode may be based on predicting the availability status of the cellular network.

In some cases, at 430, base station 105-*b* may communicate with UE 115-*b* in accordance with the dual networking mode in accordance with the indication.

Figure 5:
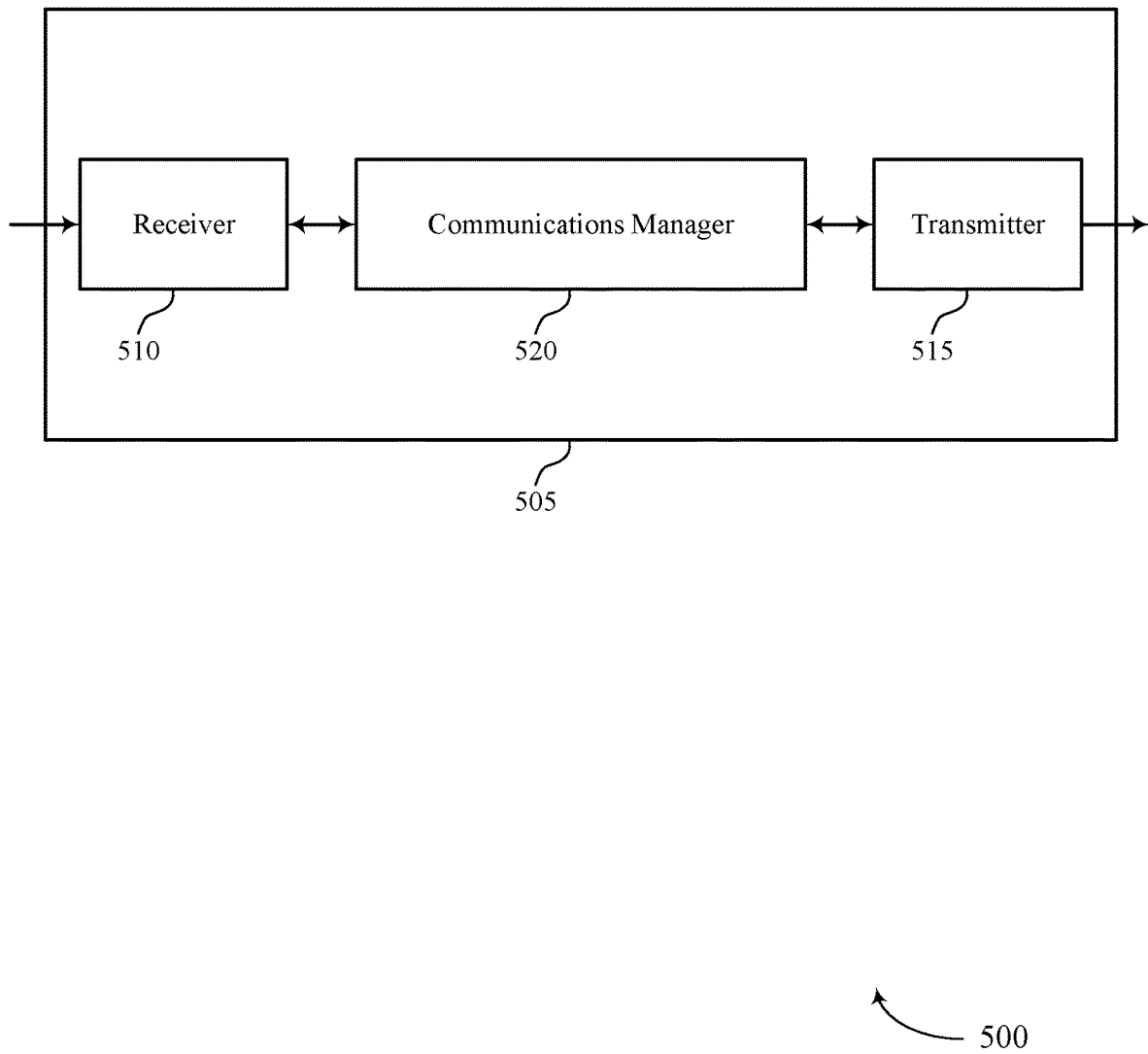
FIGS. 5 and 6 show block diagrams of devices that support techniques for operating in accordance with a dual networking mode for steering, switching and splitting traffic in accordance with aspects of the present disclosure.

FIG. 5 shows a block diagram 500 of a device 505 that supports techniques for operating in accordance with a dual networking mode for steering, switching and splitting traffic in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for operating in accordance with a dual networking mode for steering, switching and splitting traffic). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for operating in accordance with a dual networking mode for steering, switching and splitting traffic). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for operating in accordance with a dual networking mode for steering, switching and splitting traffic as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for monitoring one or more first conditions pertaining to non-cellular communications between the UE and a non-cellular network while the UE is operating in a dual networking mode for steering, switching, or splitting traffic between the non-cellular network and a cellular network. The communications manager 520 may be configured as or otherwise support a means for predicting an availability status of at least the non-cellular network based on at least one of the one or more first conditions. The communications manager 520 may be configured as or otherwise support a means for communicating in accordance with the dual networking mode using at least one of the cellular network, the non-cellular network, or a combination thereof based on the prediction.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
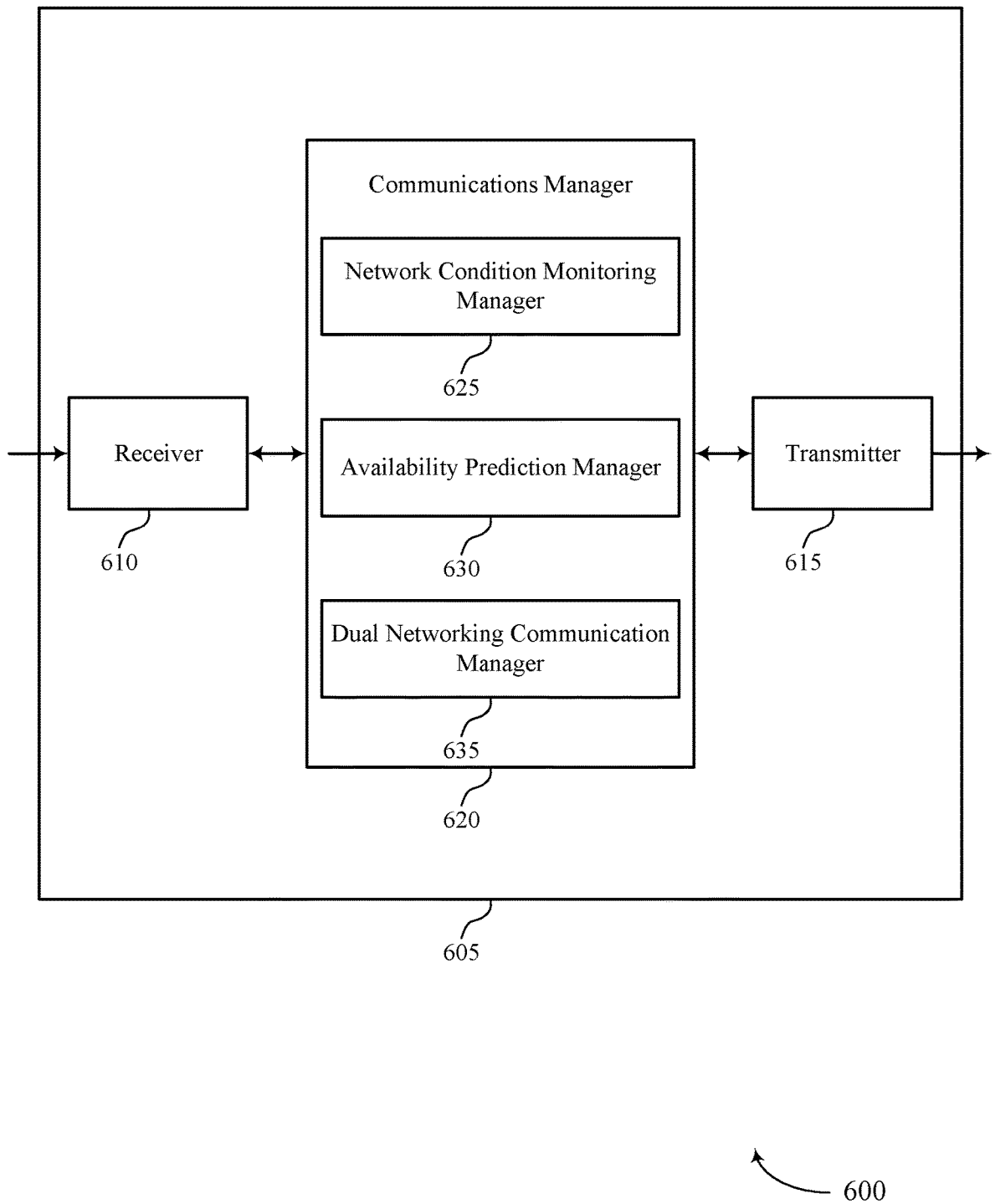

FIG. 6 shows a block diagram 600 of a device 605 that supports techniques for operating in accordance with a dual networking mode for steering, switching and splitting traffic in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for operating in accordance with a dual networking mode for steering, switching and splitting traffic). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for operating in accordance with a dual networking mode for steering, switching and splitting traffic). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for operating in accordance with a dual networking mode for steering, switching and splitting traffic as described herein. For example, the communications manager 620 may include a network condition monitoring manager 625, an availability prediction manager 630, a dual networking communication manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The network condition monitoring manager 625 may be configured as or otherwise support a means for monitoring one or more first conditions pertaining to non-cellular communications between the UE and a non-cellular network while the UE is operating in a dual networking mode for steering, switching, or splitting traffic between the non-cellular network and a cellular network. The availability prediction manager 630 may be configured as or otherwise support a means for predicting an availability status of at least the non-cellular network based on at least one of the one or more first conditions. The dual networking communication manager 635 may be configured as or otherwise support a means for communicating in accordance with the dual networking mode using at least one of the cellular network, the non-cellular network, or a combination thereof based on the prediction.

Figure 7:
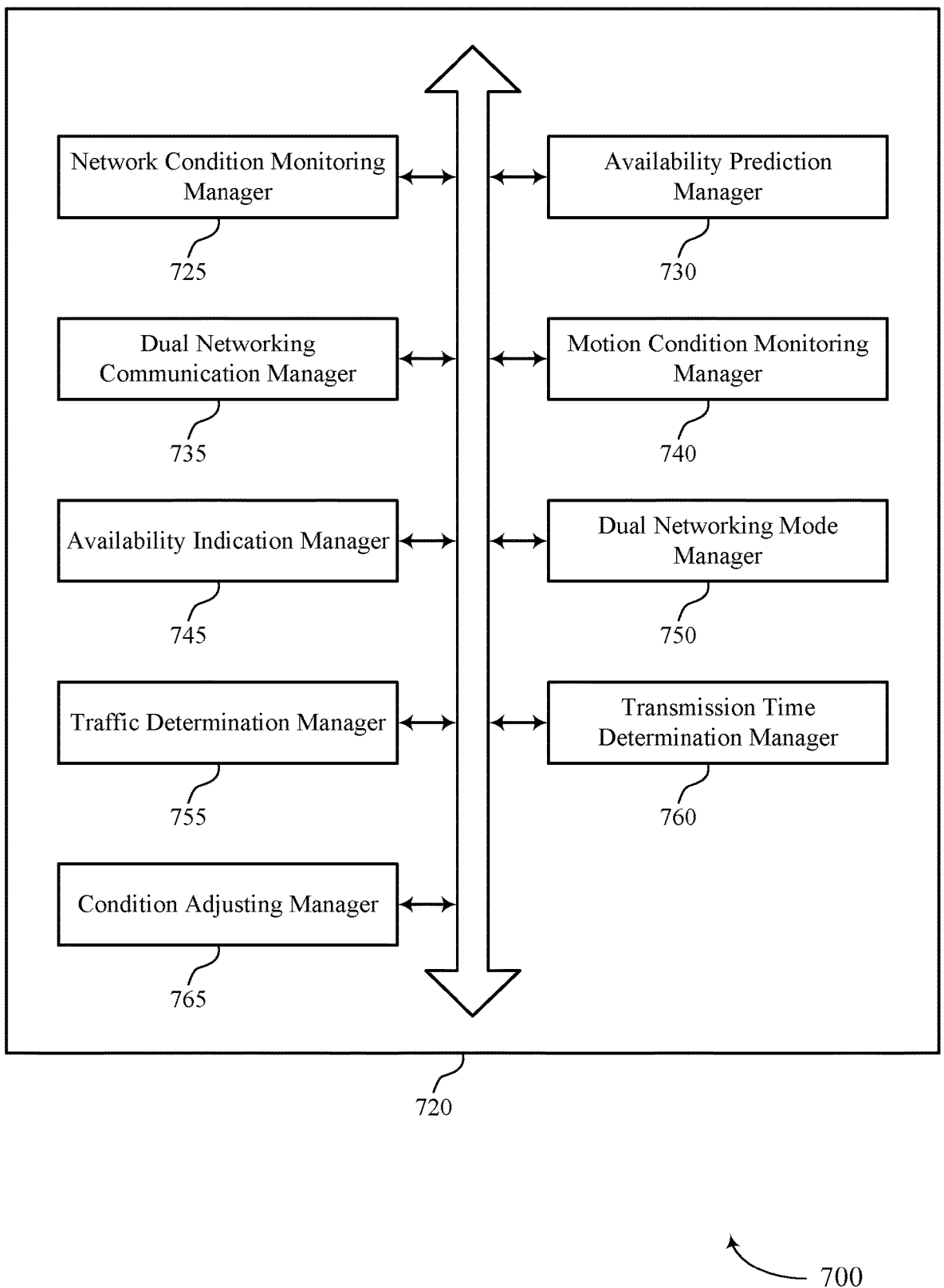
FIG. 7 shows a block diagram of a communications manager that supports techniques for operating in accordance with a dual networking mode for steering, switching and splitting traffic in accordance with aspects of the present disclosure.

FIG. 7 shows a block diagram 700 of a communications manager 720 that supports techniques for operating in accordance with a dual networking mode for steering, switching and splitting traffic in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for operating in accordance with a dual networking mode for steering, switching and splitting traffic as described herein. For example, the communications manager 720 may include a network condition monitoring manager 725, an availability prediction manager 730, a dual networking communication manager 735, a motion condition monitoring manager 740, an availability indication manager 745, a dual networking mode manager 750, a traffic determination manager 755, a transmission time determination manager 760, a condition adjusting manager 765, or any combination thereof. Each of these components may communicate, directly or indirectly, with one another (e.g., via one or more buses).

The communications manager 720 may support wireless communications at a UE in accordance with examples as disclosed herein. The network condition monitoring manager 725 may be configured as or otherwise support a means for monitoring one or more first conditions pertaining to non-cellular communications between the UE and a non-cellular network while the UE is operating in a dual networking mode for steering, switching, or splitting traffic between the non-cellular network and a cellular network. The availability prediction manager 730 may be configured as or otherwise support a means for predicting an availability status of at least the non-cellular network based on at least one of the one or more first conditions. The dual networking communication manager 735 may be configured as or otherwise support a means for communicating in accordance with the dual networking mode using at least one of the cellular network, the non-cellular network, or a combination thereof based on the prediction.

In some examples, to support predicting the availability status of the non-cellular network, the availability prediction manager 730 may be configured as or otherwise support a means for predicting that the non-cellular network will become unavailable to the UE based on at least one of the one or more first conditions.

In some examples, the availability indication manager 745 may be configured as or otherwise support a means for transmitting a message indicating that the non-cellular network will become unavailable, the message including a field indicating that the non-cellular network will become unavailable, an indication of a failure event associated with the non-cellular network, a report including one or more parameters associated with the non-cellular network, or a combination thereof.

In some examples, the transmission time determination manager 760 may be configured as or otherwise support a means for determining a time to transmit the message indicating that the non-cellular network will become unavailable, the time based on a predicted time that the non-cellular network will become unavailable, where the UE transmits the message at the time.

In some examples, the dual networking mode manager 750 may be configured as or otherwise support a means for receiving an indication for the UE to change dual networking modes in response to the message indicating that the non-cellular network will become unavailable, where the indication configures the UE to switch to the cellular network, or configures the UE to switch to a different dual networking mode.

In some examples, the dual networking mode manager 750 may be configured as or otherwise support a means for determining to change dual networking modes, where the UE determines to switch to the cellular network, or to switch to a different dual networking mode based on predicting that the non-cellular network will become unavailable.

In some examples, to support communicating, the dual networking communication manager 735 may be configured as or otherwise support a means for communicating with the cellular network based on predicting that the non-cellular network will become unavailable to the UE.

In some examples, the availability prediction manager 730 may be configured as or otherwise support a means for predicting a time at which the non-cellular network will become unavailable to the UE.

In some examples, to support monitoring the one or more first conditions, the network condition monitoring manager 725 may be configured as or otherwise support a means for monitoring signal-to-noise-plus-interference ratio (SINR) measurements at a receiver of the UE for communications with the non-cellular network, a receive-power based on channel occupancy measurements, a signal variation, a channel quality, a radio frequency signature of the non-cellular network, or a combination thereof.

In some examples, to support monitoring the one or more first conditions, the network condition monitoring manager 725 may be configured as or otherwise support a means for monitoring a Global Navigation Satellite System (GNSS) positioning of the UE, a Bluetooth connection of the UE, an application the UE is using, a quality of service requirement, or a combination thereof.

In some examples, to support monitoring the GNSS positioning of the UE, the network condition monitoring manager 725 may be configured as or otherwise support a means for determining whether the UE is near a cell-edge of the non-cellular network.

In some examples, to support monitoring the Bluetooth connection of the UE, the network condition monitoring manager 725 may be configured as or otherwise support a means for determining whether the UE is connected to a vehicle via the Bluetooth connection.

In some examples, to support monitoring the one or more first conditions, the motion condition monitoring manager 740 may be configured as or otherwise support a means for monitoring one or more motion conditions associated with a motion of the UE in relation to the non-cellular network, the one or more motion conditions including whether the UE is moving, whether the motion is localized, a type of the motion, whether the motion matches a pattern of the UE, whether the UE matches a behavior expected during an application of the UE, or a combination thereof.

In some examples, the network condition monitoring manager 725 may be configured as or otherwise support a means for monitoring one or more second conditions pertaining to cellular communications between the UE and the cellular network while the UE is operating in the dual networking mode. In some examples, the availability prediction manager 730 may be configured as or otherwise support a means for predicting an availability status of the cellular network based on at least one of the one or more second conditions, where communicating in accordance with the dual networking mode is based on predicting the availability status of the cellular network.

In some examples, to support monitoring the one or more second conditions, the network condition monitoring manager 725 may be configured as or otherwise support a means for monitoring a throughput, a degree of quality of service satisfaction, a channel quality, an occupancy of a physical downlink control channel, interference measurements, a handover procedure, or a combination thereof associated with the cellular network.

In some examples, to support monitoring the one or more second conditions, the network condition monitoring manager 725 may be configured as or otherwise support a means for monitoring a channel quality based at least on part on synchronization signal measurements, physical broadcast channel measurements, or a combination thereof.

In some examples, to support monitoring the one or more second conditions, the network condition monitoring manager 725 may be configured as or otherwise support a means for performing power detection to determine an occupancy of a physical downlink control channel, where the power detection is indicative of cell loading.

In some examples, to support monitoring the one or more second conditions, the network condition monitoring manager 725 may be configured as or otherwise support a means for monitoring for a handover from a private network to a public network, or vice versa.

In some examples, the traffic determination manager 755 may be configured as or otherwise support a means for determining whether the UE is transmitting or receiving on-going traffic with the cellular network, where the one or more second conditions is based on the determination.

In some examples, the availability prediction manager 730 may be configured as or otherwise support a means for inputting the one or more first conditions, the one or more second conditions, or a combination thereof into one or more algorithms, where the one or more algorithms predicts the availability status of at least one of the cellular network, the non-cellular network, or both.

In some examples, the one or more algorithms include a neural network, and the neural network is trained via online training or offline training.

In some examples, the condition adjusting manager 765 may be configured as or otherwise support a means for adjusting the one or more first conditions, or the one or more second conditions for predicting the availability status using the one or more algorithms.

In some examples, to support adjusting the one or more first conditions, or the one or more second conditions, the condition adjusting manager 765 may be configured as or otherwise support a means for adjusting a channel quality of the non-cellular network and comparing the adjusted channel quality to a threshold, where the adjusted channel quality is based on loading of the non-cellular network.

In some examples, the condition adjusting manager 765 may be configured as or otherwise support a means for inputting one or more backoff factors into the one or more algorithms based on alerts from a source other than a non-cellular network device.

In some examples, the condition adjusting manager 765 may be configured as or otherwise support a means for comparing the one or more first conditions, the one or more second conditions, or a combination thereof to one or more patterns, where the one or more patterns include a radio frequency signature, motion patterns, past results indicative of situations in which the UE went out of coverage of the cellular network or the non-cellular network, or a combination thereof.

In some examples, the dual networking mode for steering, switching, or splitting traffic is an Access Traffic Steering, Switching and Splitting mode.

In some examples, the non-cellular network is a WiFi network.

Figure 8:
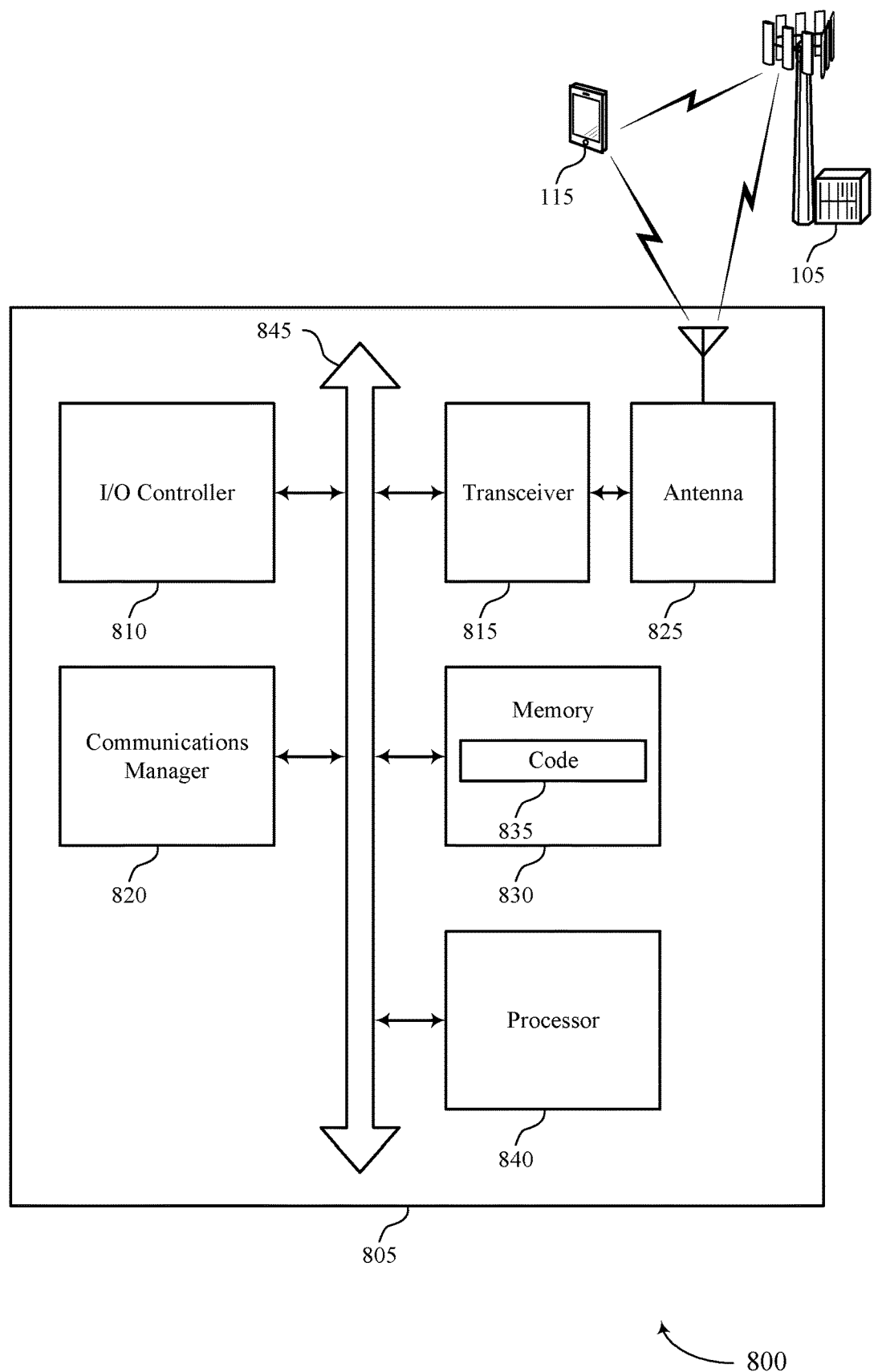
FIG. 8 shows a diagram of a system including a device that supports techniques for operating in accordance with a dual networking mode for steering, switching and splitting traffic in accordance with aspects of the present disclosure.

FIG. 8 shows a diagram of a system 800 including a device 805 that supports techniques for operating in accordance with a dual networking mode for steering, switching and splitting traffic in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for operating in accordance with a dual networking mode for steering, switching and splitting traffic). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for monitoring one or more first conditions pertaining to non-cellular communications between the UE and a non-cellular network while the UE is operating in a dual networking mode for steering, switching, or splitting traffic between the non-cellular network and a cellular network. The communications manager 820 may be configured as or otherwise support a means for predicting an availability status of at least the non-cellular network based on at least one of the one or more first conditions. The communications manager 820 may be configured as or otherwise support a means for communicating in accordance with the dual networking mode using at least one of the cellular network, the non-cellular network, or a combination thereof based on the prediction.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for operating in accordance with a dual networking mode for steering, switching and splitting traffic as described herein, or the processor 840 and the memory 830 may be otherwise configured to perform or support such operations.

Figure 9:
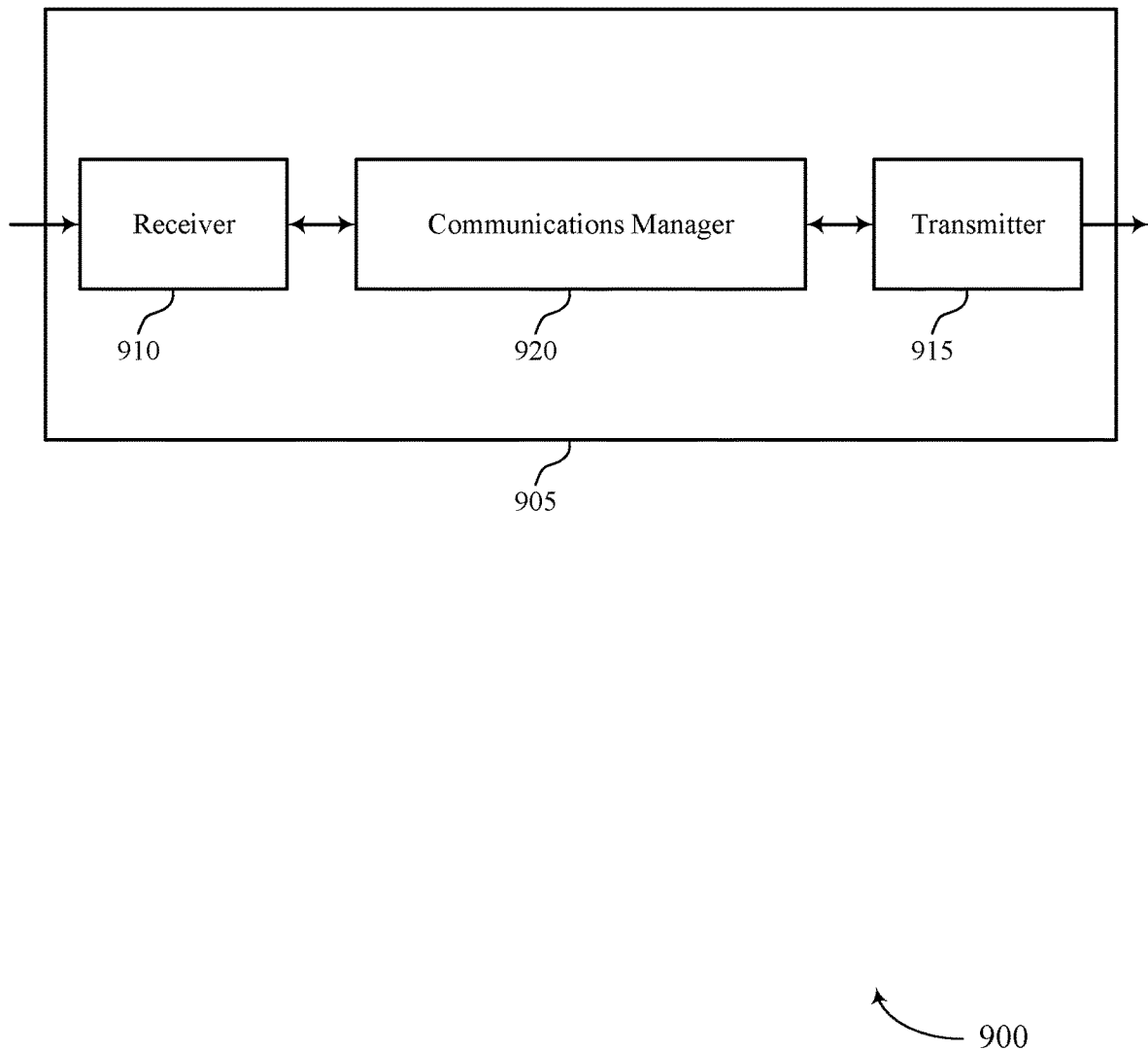
FIGS. 9 and 10 show block diagrams of devices that support techniques for operating in accordance with a dual networking mode for steering, switching and splitting traffic in accordance with aspects of the present disclosure.

FIG. 9 shows a block diagram 900 of a device 905 that supports techniques for operating in accordance with a dual networking mode for steering, switching and splitting traffic in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for operating in accordance with a dual networking mode for steering, switching and splitting traffic). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for operating in accordance with a dual networking mode for steering, switching and splitting traffic). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for operating in accordance with a dual networking mode for steering, switching and splitting traffic as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network. The communications manager 920 may be configured as or otherwise support a means for transmitting an indication for the UE to change dual networking modes, where the indication configures the UE to switch to the cellular network, or configures the UE to switch to a different dual networking mode. The communications manager 920 may be configured as or otherwise support a means for communicating with the UE in accordance with the dual networking mode in accordance with the indication.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources.

Figure 10:
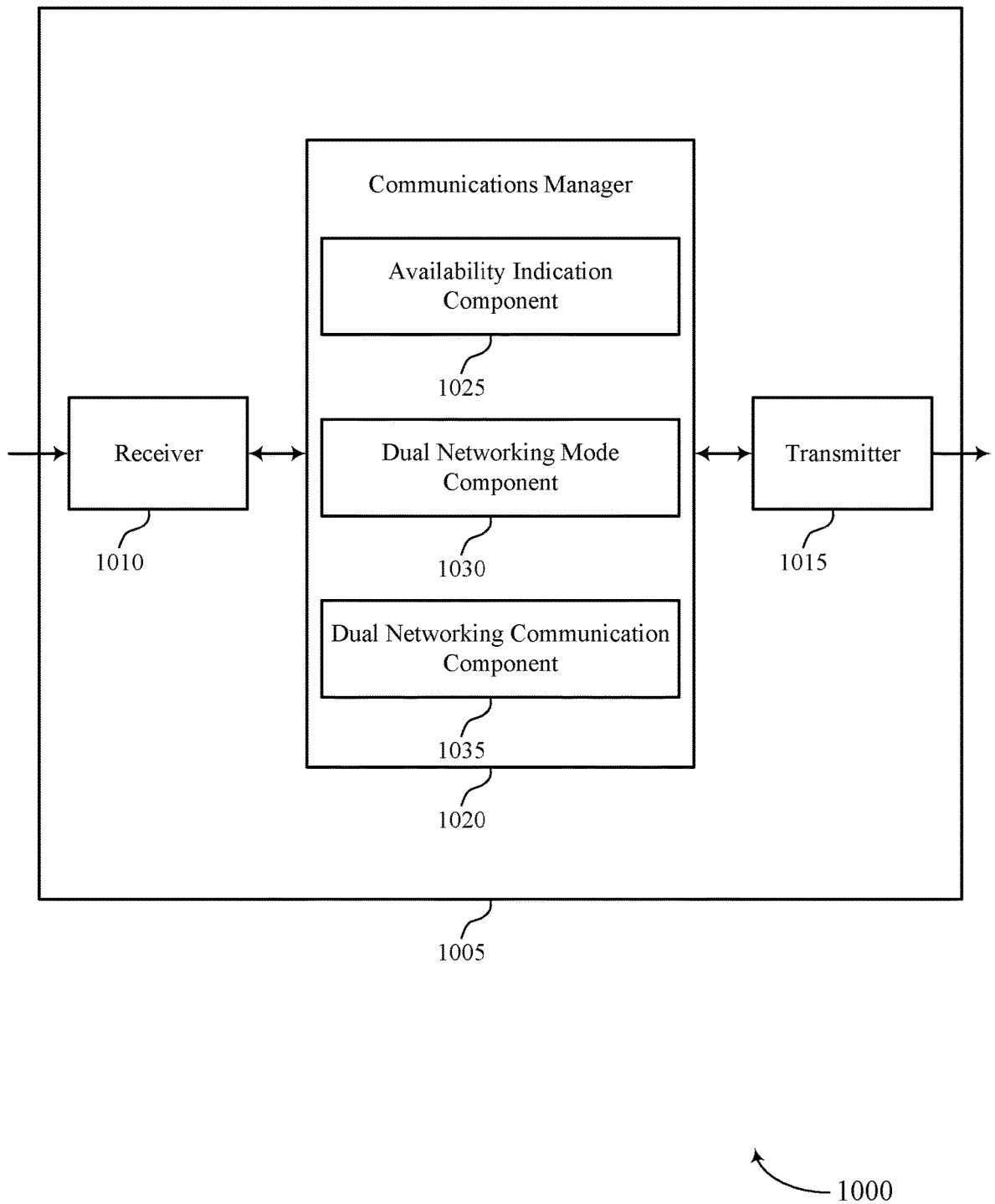

FIG. 10 shows a block diagram 1000 of a device 1005 that supports techniques for operating in accordance with a dual networking mode for steering, switching and splitting traffic in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for operating in accordance with a dual networking mode for steering, switching and splitting traffic). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for operating in accordance with a dual networking mode for steering, switching and splitting traffic). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for operating in accordance with a dual networking mode for steering, switching and splitting traffic as described herein. For example, the communications manager 1020 may include an availability indication component 1025, a dual networking mode component 1030, a dual networking communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The availability indication component 1025 may be configured as or otherwise support a means for receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network. The dual networking mode component 1030 may be configured as or otherwise support a means for transmitting an indication for the UE to change dual networking modes, where the indication configures the UE to switch to the cellular network, or configures the UE to switch to a different dual networking mode. The dual networking communication component 1035 may be configured as or otherwise support a means for communicating with the UE in accordance with the dual networking mode in accordance with the indication.

Figure 11:
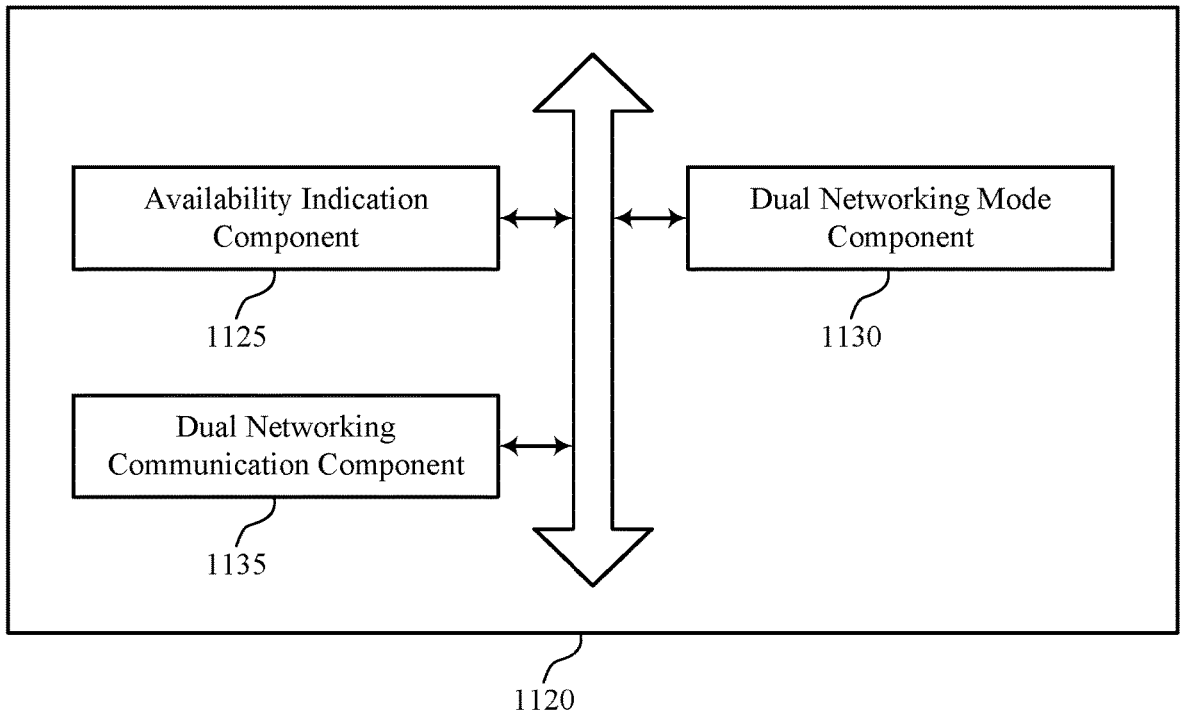
FIG. 11 shows a block diagram of a communications manager that supports techniques for operating in accordance with a dual networking mode for steering, switching and splitting traffic in accordance with aspects of the present disclosure.

FIG. 11 shows a block diagram 1100 of a communications manager 1120 that supports techniques for operating in accordance with a dual networking mode for steering, switching and splitting traffic in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for operating in accordance with a dual networking mode for steering, switching and splitting traffic as described herein. For example, the communications manager 1120 may include an availability indication component 1125, a dual networking mode component 1130, a dual networking communication component 1135, or any combination thereof. Each of these components may communicate, directly or indirectly, with one another (e.g., via one or more buses).

The communications manager 1120 may support wireless communications at a base station in accordance with examples as disclosed herein. The availability indication component 1125 may be configured as or otherwise support a means for receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network. The dual networking mode component 1130 may be configured as or otherwise support a means for transmitting an indication for the UE to change dual networking modes, where the indication configures the UE to switch to the cellular network, or configures the UE to switch to a different dual networking mode. The dual networking communication component 1135 may be configured as or otherwise support a means for communicating with the UE in accordance with the dual networking mode in accordance with the indication.

In some examples, the message includes a field indicating that the non-cellular network will become unavailable, an indication of a failure event associated with the non-cellular network, a report including one or more parameters associated with the non-cellular network, or a combination thereof.

In some examples, the dual networking mode for steering, switching, or splitting traffic is an Access Traffic Steering, Switching and Splitting mode.

In some examples, the non-cellular network is a WiFi network.

Figure 12:
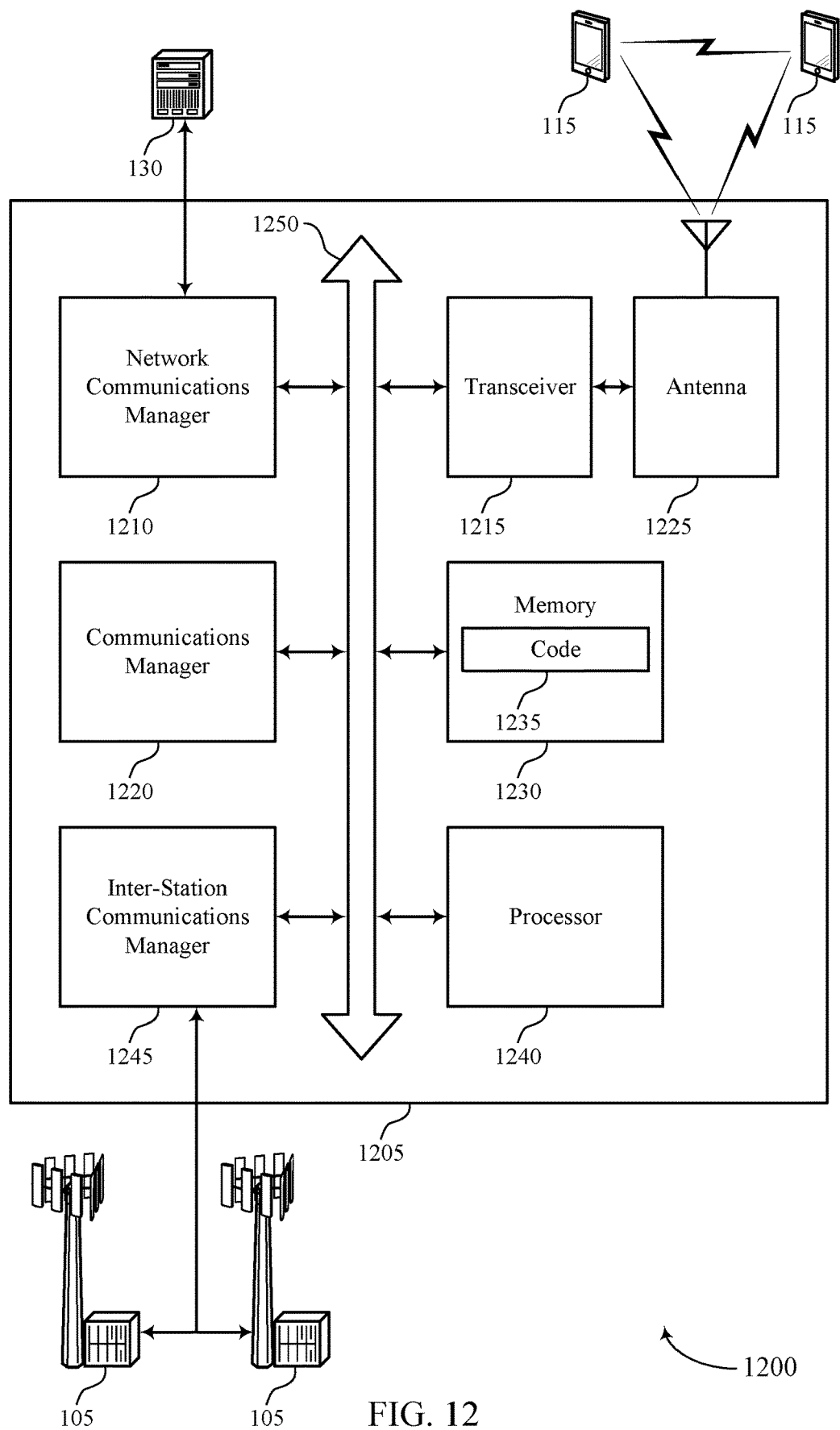
FIG. 12 shows a diagram of a system including a device that supports techniques for operating in accordance with a dual networking mode for steering, switching and splitting traffic in accordance with aspects of the present disclosure.

FIG. 12 shows a diagram of a system 1200 including a device 1205 that supports techniques for operating in accordance with a dual networking mode for steering, switching and splitting traffic in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for operating in accordance with a dual networking mode for steering, switching and splitting traffic). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network. The communications manager 1220 may be configured as or otherwise support a means for transmitting an indication for the UE to change dual networking modes, where the indication configures the UE to switch to the cellular network, or configures the UE to switch to a different dual networking mode. The communications manager 1220 may be configured as or otherwise support a means for communicating with the UE in accordance with the dual networking mode in accordance with the indication.

By including or configuring the communications manager 1220 in accordance with examples as described herein, the device 1205 may support techniques for improved communication reliability, reduced latency, more efficient utilization of communication resources, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for operating in accordance with a dual networking mode for steering, switching and splitting traffic as described herein, or the processor 1240 and the memory 1230 may be otherwise configured to perform or support such operations.

Figure 13:
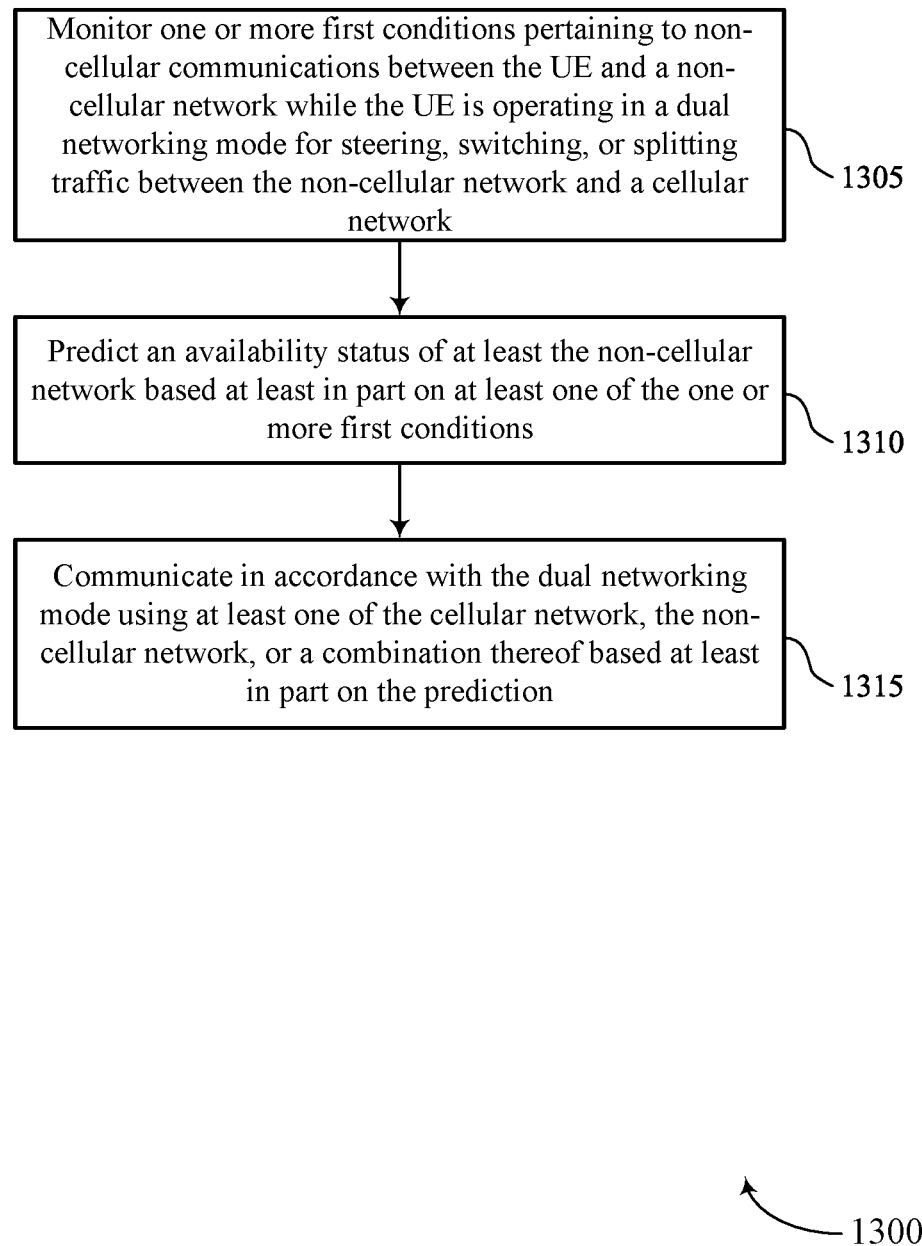
FIGS. 13 through 16 show flowcharts illustrating methods that support techniques for operating in accordance with a dual networking mode for steering, switching and splitting traffic in accordance with aspects of the present disclosure.

FIG. 13 shows a flowchart illustrating a method 1300 that supports techniques for operating in accordance with a dual networking mode for steering, switching and splitting traffic in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include monitoring one or more first conditions pertaining to non-cellular communications between the UE and a non-cellular network while the UE is operating in a dual networking mode for steering, switching, or splitting traffic between the non-cellular network and a cellular network. The operations of 1305 may be performed in accordance with examples as disclosed herein. In some examples, aspects of the operations of 1305 may be performed by a network condition monitoring manager 725 as described with reference to FIG. 7.

At 1310, the method may include predicting an availability status of at least the non-cellular network based on at least one of the one or more first conditions. The operations of 1310 may be performed in accordance with examples as disclosed herein. In some examples, aspects of the operations of 1310 may be performed by an availability prediction manager 730 as described with reference to FIG. 7.

At 1315, the method may include communicating in accordance with the dual networking mode using at least one of the cellular network, the non-cellular network, or a combination thereof based on the prediction. The operations of 1315 may be performed in accordance with examples as disclosed herein. In some examples, aspects of the operations of 1315 may be performed by a dual networking communication manager 735 as described with reference to FIG. 7.

Figure 14:
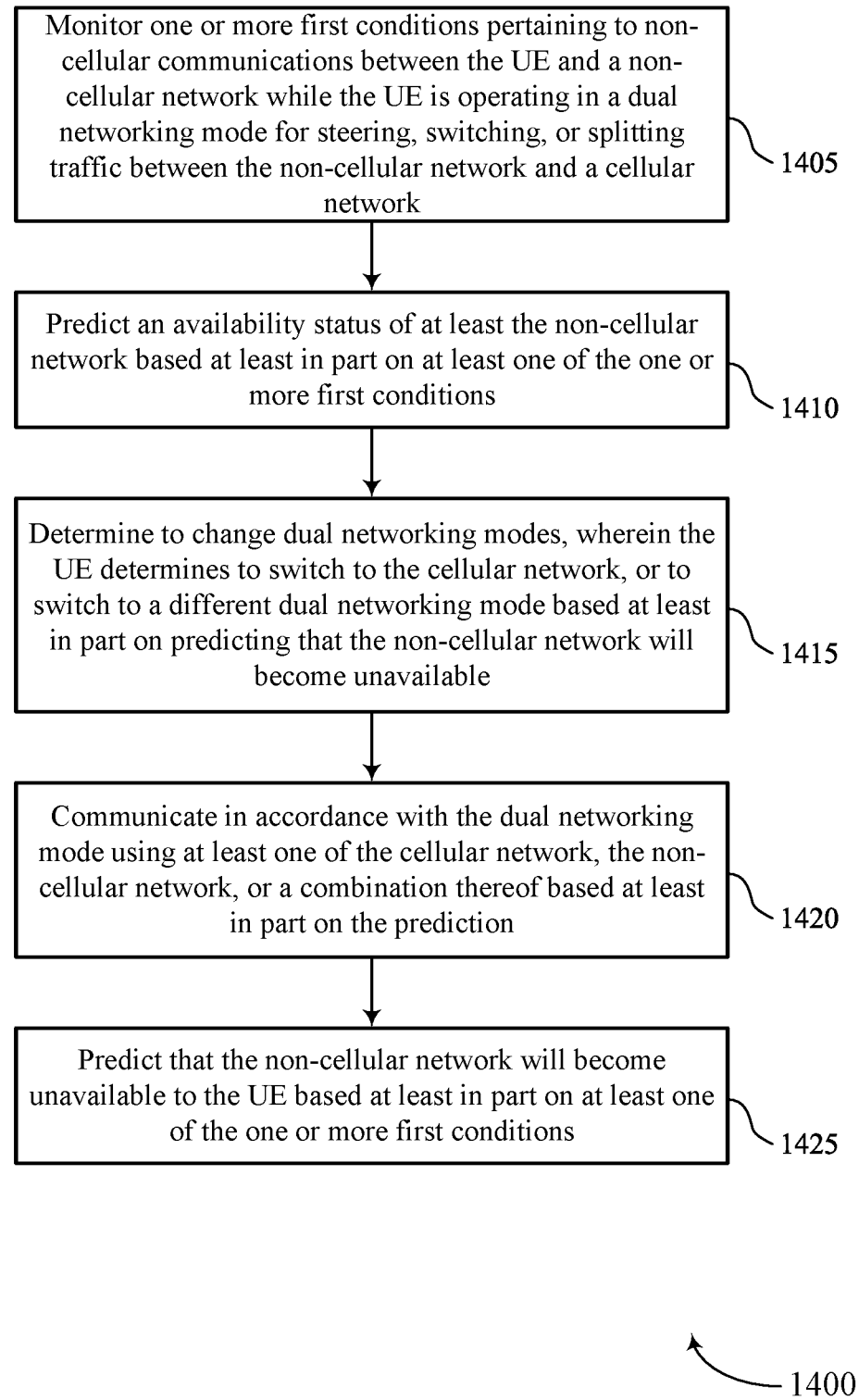

FIG. 14 shows a flowchart illustrating a method 1400 that supports techniques for operating in accordance with a dual networking mode for steering, switching and splitting traffic in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include monitoring one or more first conditions pertaining to non-cellular communications between the UE and a non-cellular network while the UE is operating in a dual networking mode for steering, switching, or splitting traffic between the non-cellular network and a cellular network. The operations of 1405 may be performed in accordance with examples as disclosed herein. In some examples, aspects of the operations of 1405 may be performed by a network condition monitoring manager 725 as described with reference to FIG. 7.

At 1410, the method may include predicting an availability status of at least the non-cellular network based on at least one of the one or more first conditions. The operations of 1410 may be performed in accordance with examples as disclosed herein. In some examples, aspects of the operations of 1410 may be performed by an availability prediction manager 730 as described with reference to FIG. 7.

At 1415, the method may include determining to change dual networking modes, where the UE determines to switch to the cellular network, or to switch to a different dual networking mode based on predicting that the non-cellular network will become unavailable. The operations of 1415 may be performed in accordance with examples as disclosed herein. In some examples, aspects of the operations of 1415 may be performed by a dual networking mode manager 750 as described with reference to FIG. 7.

At 1420, the method may include communicating in accordance with the dual networking mode using at least one of the cellular network, the non-cellular network, or a combination thereof based on the prediction. The operations of 1420 may be performed in accordance with examples as disclosed herein. In some examples, aspects of the operations of 1420 may be performed by a dual networking communication manager 735 as described with reference to FIG. 7.

At 1425, the method may include predicting that the non-cellular network will become unavailable to the UE based on at least one of the one or more first conditions. The operations of 1425 may be performed in accordance with examples as disclosed herein. In some examples, aspects of the operations of 1425 may be performed by an availability prediction manager 730 as described with reference to FIG. 7.

Figure 15:
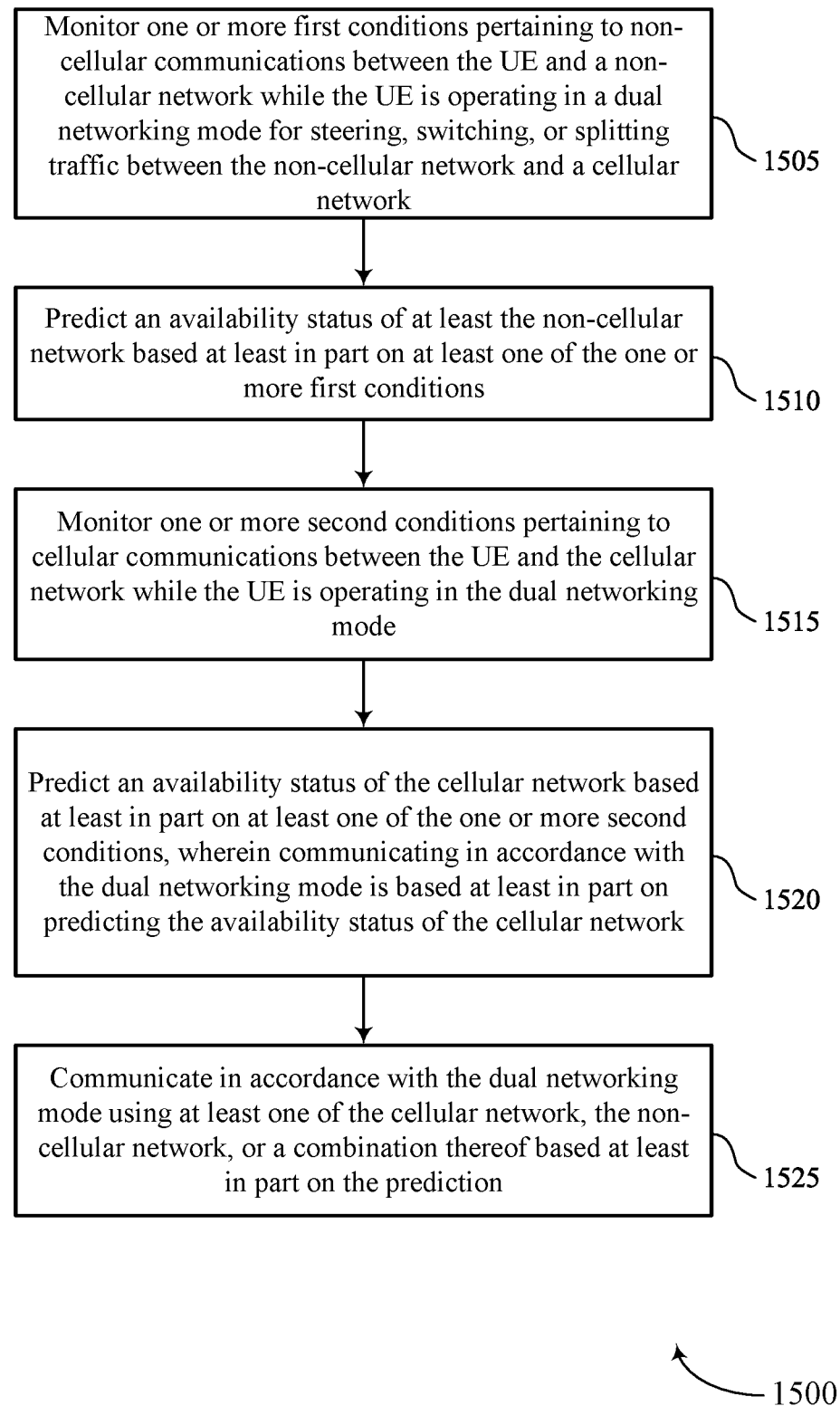

FIG. 15 shows a flowchart illustrating a method 1500 that supports techniques for operating in accordance with a dual networking mode for steering, switching and splitting traffic in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include monitoring one or more first conditions pertaining to non-cellular communications between the UE and a non-cellular network while the UE is operating in a dual networking mode for steering, switching, or splitting traffic between the non-cellular network and a cellular network. The operations of 1505 may be performed in accordance with examples as disclosed herein. In some examples, aspects of the operations of 1505 may be performed by a network condition monitoring manager 725 as described with reference to FIG. 7.

At 1510, the method may include predicting an availability status of at least the non-cellular network based on at least one of the one or more first conditions. The operations of 1510 may be performed in accordance with examples as disclosed herein. In some examples, aspects of the operations of 1510 may be performed by an availability prediction manager 730 as described with reference to FIG. 7.

At 1515, the method may include monitoring one or more second conditions pertaining to cellular communications between the UE and the cellular network while the UE is operating in the dual networking mode. The operations of 1515 may be performed in accordance with examples as disclosed herein. In some examples, aspects of the operations of 1515 may be performed by a network condition monitoring manager 725 as described with reference to FIG. 7.

At 1520, the method may include predicting an availability status of the cellular network based on at least one of the one or more second conditions, where communicating in accordance with the dual networking mode is based on predicting the availability status of the cellular network. The operations of 1520 may be performed in accordance with examples as disclosed herein. In some examples, aspects of the operations of 1520 may be performed by an availability prediction manager 730 as described with reference to FIG. 7.

At 1525, the method may include communicating in accordance with the dual networking mode using at least one of the cellular network, the non-cellular network, or a combination thereof based on the prediction. The operations of 1525 may be performed in accordance with examples as disclosed herein. In some examples, aspects of the operations of 1525 may be performed by a dual networking communication manager 735 as described with reference to FIG. 7.

Figure 16:
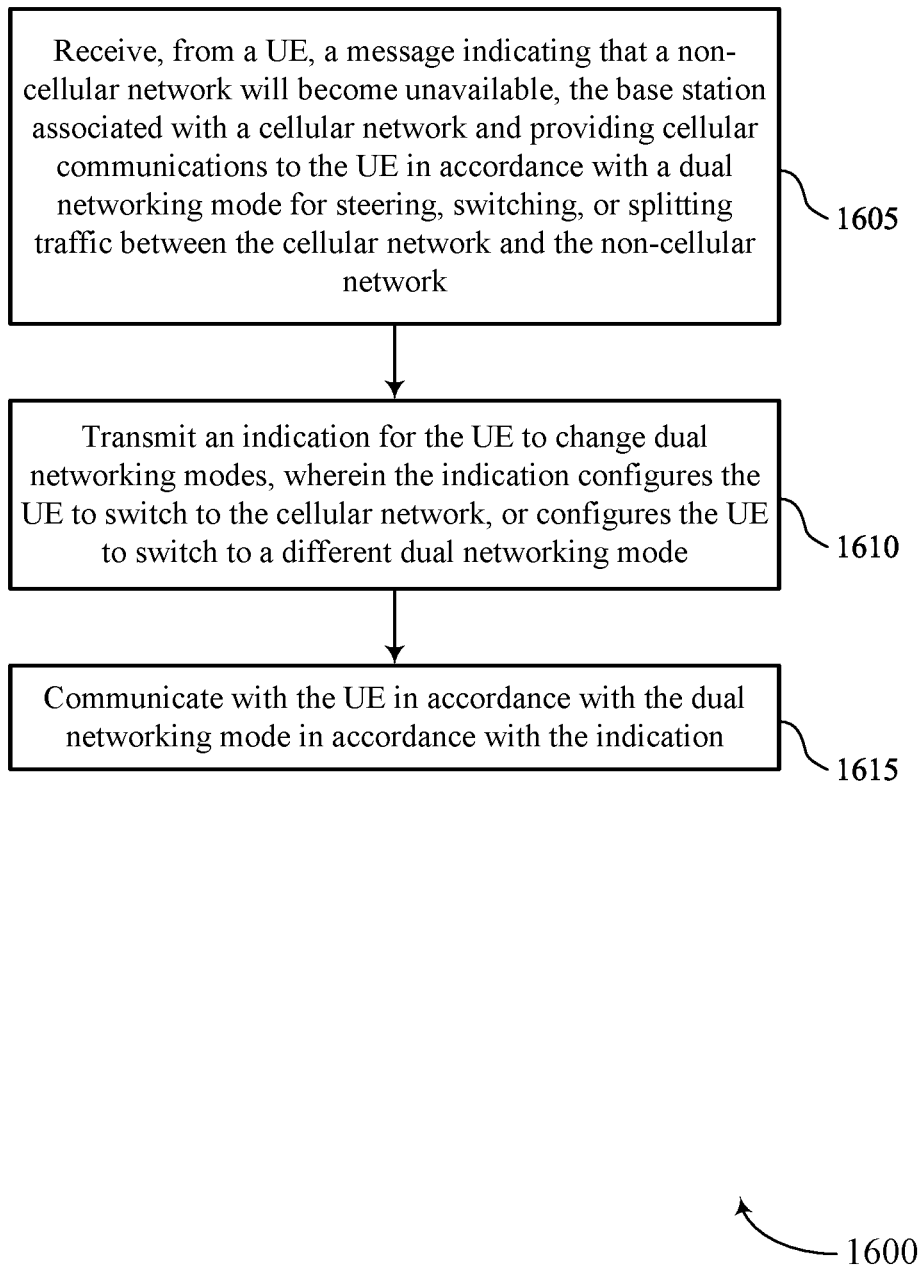

FIG. 16 shows a flowchart illustrating a method 1600 that supports techniques for operating in accordance with a dual networking mode for steering, switching and splitting traffic in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network. The operations of 1605 may be performed in accordance with examples as disclosed herein. In some examples, aspects of the operations of 1605 may be performed by an availability indication component 1125 as described with reference to FIG. 11.

At 1610, the method may include transmitting an indication for the UE to change dual networking modes, where the indication configures the UE to switch to the cellular network, or configures the UE to switch to a different dual networking mode. The operations of 1610 may be performed in accordance with examples as disclosed herein. In some examples, aspects of the operations of 1610 may be performed by a dual networking mode component 1130 as described with reference to FIG. 11.

At 1615, the method may include communicating with the UE in accordance with the dual networking mode in accordance with the indication. The operations of 1615 may be performed in accordance with examples as disclosed herein. In some examples, aspects of the operations of 1615 may be performed by a dual networking communication component 1135 as described with reference to FIG. 11.

The following provides an overview of aspects of the present disclosure:

Aspect 1: A method for wireless communications at a UE, comprising: monitoring one or more first conditions pertaining to non-cellular communications between the UE and a non-cellular network while the UE is operating in a dual networking mode for steering, switching, or splitting traffic between the non-cellular network and a cellular network; predicting an availability status of at least the non-cellular network based at least in part on at least one of the one or more first conditions; and communicating in accordance with the dual networking mode using at least one of the cellular network, the non-cellular network, or a combination thereof based at least in part on the prediction.

Aspect 2: The method of aspect 1, wherein predicting the availability status of the non-cellular network further comprises: predicting that the non-cellular network will become unavailable to the UE based at least in part on at least one of the one or more first conditions.

Aspect 3: The method of aspect 2, further comprising: transmitting a message indicating that the non-cellular network will become unavailable, the message comprising a field indicating that the non-cellular network will become unavailable, an indication of a failure event associated with the non-cellular network, a report comprising one or more parameters associated with the non-cellular network, or a combination thereof.

Aspect 4: The method of aspect 3, further comprising: determining a time to transmit the message indicating that the non-cellular network will become unavailable, the time based at least in part on a predicted time that the non-cellular network will become unavailable, wherein the UE transmits the message at the time.

Aspect 5: The method of any of aspects 3 through 4, further comprising: receiving an indication for the UE to change dual networking modes in response to the message indicating that the non-cellular network will become unavailable, wherein the indication configures the UE to switch to the cellular network, or configures the UE to switch to a different dual networking mode.

Aspect 6: The method of any of aspects 2 through 5, further comprising: determining to change dual networking modes, wherein the UE determines to switch to the cellular network, or to switch to a different dual networking mode based at least in part on predicting that the non-cellular network will become unavailable.

Aspect 7: The method of any of aspects 2 through 6, wherein communicating further comprises: communicating with the cellular network based at least in part on predicting that the non-cellular network will become unavailable to the UE.

Aspect 8: The method of any of aspects 2 through 7, further comprising: predicting a time at which the non-cellular network will become unavailable to the UE.

Aspect 9: The method of any of aspects 1 through 8, wherein monitoring the one or more first conditions further comprises: monitoring signal-to-noise-plus-interference ratio (SINR) measurements at a receiver of the UE for communications with the non-cellular network, a receive-power based at least in part on channel occupancy measurements, a signal variation, a channel quality, a radio frequency signature of the non-cellular network, or a combination thereof.

Aspect 10: The method of any of aspects 1 through 9, wherein monitoring the one or more first conditions further comprises: monitoring a Global Navigation Satellite System (GNSS) positioning of the UE, a Bluetooth connection of the UE, an application the UE is using, a quality of service requirement, or a combination thereof.

Aspect 11: The method of aspect 10, wherein monitoring the GNSS positioning of the UE further comprises: determining whether the UE is near a cell-edge of the non-cellular network.

Aspect 12: The method of any of aspects 10 through 11, wherein monitoring the Bluetooth connection of the UE further comprises: determining whether the UE is connected to a vehicle via the Bluetooth connection.

Aspect 13: The method of any of aspects 1 through 12, wherein monitoring the one or more first conditions further comprises: monitoring one or more motion conditions associated with a motion of the UE in relation to the non-cellular network, the one or more motion conditions comprising whether the UE is moving, whether the motion is localized, a type of the motion, whether the motion matches a pattern of the UE, whether the UE matches a behavior expected during an application of the UE, or a combination thereof.

Aspect 14: The method of any of aspects 1 through 13, further comprising: monitoring one or more second conditions pertaining to cellular communications between the UE and the cellular network while the UE is operating in the dual networking mode; and predicting an availability status of the cellular network based at least in part on at least one of the one or more second conditions, wherein communicating in accordance with the dual networking mode is based at least in part on predicting the availability status of the cellular network.

Aspect 15: The method of aspect 14, wherein monitoring the one or more second conditions further comprises: monitoring a throughput, a degree of quality of service satisfaction, a channel quality, an occupancy of a physical downlink control channel, interference measurements, a handover procedure, or a combination thereof associated with the cellular network.

Aspect 16: The method of any of aspects 14 through 15, wherein monitoring the one or more second conditions further comprises: monitoring a channel quality based at least on part on synchronization signal measurements, physical broadcast channel measurements, or a combination thereof.

Aspect 17: The method of any of aspects 14 through 16, wherein monitoring the one or more second conditions further comprises: performing power detection to determine an occupancy of a physical downlink control channel, wherein the power detection is indicative of cell loading.

Aspect 18: The method of any of aspects 14 through 17, wherein monitoring the one or more second conditions further comprises: monitoring for a handover from a private network to a public network, or vice versa.

Aspect 19: The method of any of aspects 14 through 18, further comprising: determining whether the UE is transmitting or receiving on-going traffic with the cellular network, wherein the one or more second conditions is based at least in part on the determination.

Aspect 20: The method of any of aspects 14 through 19, further comprising: inputting the one or more first conditions, the one or more second conditions, or a combination thereof into one or more algorithms, wherein the one or more algorithms predicts the availability status of at least one of the cellular network, the non-cellular network, or both.

Aspect 21: The method of aspect 20, wherein the one or more algorithms comprise a neural network, and the neural network is trained via online training or offline training.

Aspect 22: The method of any of aspects 20 through 21, further comprising: adjusting the one or more first conditions, or the one or more second conditions for predicting the availability status using the one or more algorithms.

Aspect 23: The method of aspect 22, wherein adjusting the one or more first conditions, or the one or more second conditions further comprises: adjusting a channel quality of the non-cellular network and comparing the adjusted channel quality to a threshold, wherein the adjusted channel quality is based at least in part on loading of the non-cellular network.

Aspect 24: The method of any of aspects 20 through 23, further comprising: inputting one or more backoff factors into the one or more algorithms based at least in part on alerts from a source other than a non-cellular network device.

Aspect 25: The method of any of aspects 20 through 24, further comprising: comparing the one or more first conditions, the one or more second conditions, or a combination thereof to one or more patterns, wherein the one or more patterns comprise a radio frequency signature, motion patterns, past results indicative of situations in which the UE went out of coverage of the cellular network or the non-cellular network, or a combination thereof.

Aspect 26: The method of any of aspects 1 through 25, wherein the dual networking mode for steering, switching, or splitting traffic is an Access Traffic Steering, Switching and Splitting mode.

Aspect 27: The method of any of aspects 1 through 26, wherein the non-cellular network is a WiFi network.

Aspect 28: A method for wireless communications at a base station, comprising: receiving, from a UE, a message indicating that a non-cellular network will become unavailable, the base station associated with a cellular network and providing cellular communications to the UE in accordance with a dual networking mode for steering, switching, or splitting traffic between the cellular network and the non-cellular network; transmitting an indication for the UE to change dual networking modes, wherein the indication configures the UE to switch to the cellular network, or configures the UE to switch to a different dual networking mode; and communicating with the UE in accordance with the dual networking mode in accordance with the indication.

Aspect 29: The method of aspect 28, wherein the message comprises a field indicating that the non-cellular network will become unavailable, an indication of a failure event associated with the non-cellular network, a report comprising one or more parameters associated with the non-cellular network, or a combination thereof.

Aspect 30: The method of any of aspects 28 through 29, wherein the dual networking mode for steering, switching, or splitting traffic is an Access Traffic Steering, Switching and Splitting mode.

Aspect 31: The method of any of aspects 28 through 30, wherein the non-cellular network is a WiFi network.

Aspect 32: An apparatus for wireless communications, comprising a processor; memory coupled with the processor; and instructions stored in the memory and executable by the processor to cause the apparatus to perform a method of any of aspects 1 through 27.

Aspect 33: An apparatus for wireless communications, comprising at least one means for performing a method of any of aspects 1 through 27.

Aspect 34: A non-transitory computer-readable medium storing code for wireless communications, the code comprising instructions executable by a processor to perform a method of any of aspects 1 through 27.

Aspect 35: An apparatus for wireless communications, comprising a processor; memory coupled with the processor; and instructions stored in the memory and executable by the processor to cause the apparatus to perform a method of any of aspects 28 through 31.

Aspect 36: An apparatus for wireless communications, comprising at least one means for performing a method of any of aspects 28 through 31.

Aspect 37: A non-transitory computer-readable medium storing code for wireless communications, the code comprising instructions executable by a processor to perform a method of any of aspects 28 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   monitoring one or more first conditions pertaining to non-cellular communications between the UE and a non-cellular network while the UE is operating in a dual networking mode for steering, switching, or splitting traffic between the non-cellular network and a cellular network;
   predicting that the non-cellular network will become unavailable to the UE and a time at which the non-cellular network will become unavailable to the UE based at least in part on at least one of the one or more first conditions; and
   communicating in accordance with the dual networking mode using at least one of the cellular network, the non-cellular network, or a combination thereof based at least in part on the prediction.

2. The method of claim 1, further comprising:
   transmitting a message indicating that the non-cellular network will become unavailable, the message comprising a field indicating that the non-cellular network will become unavailable, an indication of a failure event associated with the non-cellular network, a report comprising one or more parameters associated with the non-cellular network, or a combination thereof.

3. The method of claim 2, further comprising:
   determining a time to transmit the message indicating that the non-cellular network will become unavailable, the time based at least in part on a predicted time that the non- cellular network will become unavailable, wherein the UE transmits the message at the time.

4. The method of claim 2, further comprising:
   receiving an indication for the UE to change dual networking modes in response to the message indicating that the non-cellular network will become unavailable, wherein the indication configures the UE to switch to the cellular network, or configures the UE to switch to a different dual networking mode.

5. The method of claim 1, further comprising:
   determining to change dual networking modes, wherein the UE determines to switch to the cellular network, or to switch to a different dual networking mode based at least in part on predicting that the non-cellular network will become unavailable.

6. The method of claim 1, wherein communicating further comprises:
   communicating with the cellular network based at least in part on predicting that the non-cellular network will become unavailable to the UE.

7. The method of claim 1, wherein monitoring the one or more first conditions further comprises:
   monitoring signal-to-noise-plus-interference ratio (SINR) measurements at a receiver of the UE for communications with the non-cellular network, a receive-power based at least in part on channel occupancy measurements, a signal variation, a channel quality, a radio frequency signature of the non-cellular network, or a combination thereof.

8. The method of claim 1, wherein monitoring the one or more first conditions further comprises:
   monitoring a Global Navigation Satellite System (GNSS) positioning of the UE, a Bluetooth connection of the UE, an application the UE is using, a quality of service requirement, or a combination thereof.

9. The method of claim 1, wherein monitoring the one or more first conditions further comprises:
   monitoring one or more motion conditions associated with a motion of the UE in relation to the non-cellular network, the one or more motion conditions comprising whether the UE is moving, whether the motion is localized, a type of the motion, whether the motion matches a pattern of the UE, whether the UE matches a behavior expected during an application of the UE, or a combination thereof.

10. The method of claim 1, further comprising:
monitoring one or more second conditions pertaining to cellular communications between the UE and the cellular network while the UE is operating in the dual networking mode; and
predicting an availability status of the cellular network based at least in part on at least one of the one or more second conditions, wherein communicating in accordance with the dual networking mode is based at least in part on predicting the availability status of the cellular network.

11. The method of claim 10, wherein monitoring the one or more second conditions further comprises:
monitoring a throughput, a degree of quality of service satisfaction, a channel quality, an occupancy of a physical downlink control channel, interference measurements, a handover procedure, or a combination thereof associated with the cellular network.

12. The method of claim 10, further comprising:
inputting the one or more first conditions, the one or more second conditions, or a combination thereof into one or more algorithms, wherein the one or more algorithms predicts the availability status of at least one of the cellular network, the non-cellular network, or both.

13. An apparatus for wireless communications, comprising:
a processor;
memory coupled with the processor; and
instructions stored in the memory and executable by the processor to cause the apparatus to:
monitor one or more first conditions pertaining to non-cellular communications between a user equipment (UE) and a non-cellular network while the UE is operating in a dual networking mode for steering, switching, or splitting traffic between the non-cellular network and a cellular network;
predict that the non-cellular network will become unavailable to the UE and a time at which the non-cellular network will become unavailable to the UE based at least in part on at least one of the one or more first conditions; and
communicate in accordance with the dual networking mode using at least one of the cellular network, the non-cellular network, or a combination thereof based at least in part on the prediction.

14. The apparatus of claim 13, wherein the instructions are further executable by the processor to cause the apparatus to:
transmit a message indicating that the non-cellular network will become unavailable, the message comprising a field indicating that the non-cellular network will become unavailable, an indication of a failure event associated with the non-cellular network, a report comprising one or more parameters associated with the non-cellular network, or a combination thereof.

15. The apparatus of claim 14, wherein the instructions are further executable by the processor to cause the apparatus to:
determine a time to transmit the message indicating that the non-cellular network will become unavailable, the time based at least in part on a predicted time that the non-cellular network will become unavailable, wherein the UE transmits the message at the time.

16. The apparatus of claim 14, wherein the instructions are further executable by the processor to cause the apparatus to:
receive an indication for the UE to change dual networking modes in response to the message indicating that the non-cellular network will become unavailable, wherein the indication configures the UE to switch to the cellular network, or configures the UE to switch to a different dual networking mode.

17. The apparatus of claim 13, wherein the instructions are further executable by the processor to cause the apparatus to:
determine to change dual networking modes, wherein the UE determines to switch to the cellular network, or to switch to a different dual networking mode based at least in part on predicting that the non-cellular network will become unavailable.

18. The apparatus of claim 13, wherein the instructions to communicate are further executable by the processor to cause the apparatus to:
communicate with the cellular network based at least in part on predicting that the non-cellular network will become unavailable to the UE.

19. The apparatus of claim 13, wherein the instructions to monitor the one or more first conditions are further executable by the processor to cause the apparatus to:
monitor signal-to-noise-plus-interference ratio (SINR) measurements at a receiver of the UE for communications with the non-cellular network, a receive-power based at least in part on channel occupancy measurements, a signal variation, a channel quality, a radio frequency signature of the non-cellular network, or a combination thereof.

20. The apparatus of claim 13, wherein the instructions to monitor the one or more first conditions are further executable by the processor to cause the apparatus to:
monitor a Global Navigation Satellite System (GNSS) positioning of the UE, a Bluetooth connection of the UE, an application the UE is using, a quality of service requirement, or a combination thereof.

21. The apparatus of claim 13, wherein the instructions to monitor the one or more first conditions are further executable by the processor to cause the apparatus to:
monitor one or more motion conditions associated with a motion of the UE in relation to the non-cellular network, the one or more motion conditions comprising whether the UE is moving, whether the motion is localized, a type of the motion, whether the motion matches a pattern of the UE, whether the UE matches a behavior expected during an application of the UE, or a combination thereof.

22. The apparatus of claim 13, wherein the instructions are further executable by the processor to cause the apparatus to:
monitor one or more second conditions pertaining to cellular communications between the UE and the cellular network while the UE is operating in the dual networking mode; and
predict an availability status of the cellular network based at least in part on at least one of the one or more second conditions, wherein communicating in accordance with the dual networking mode is based at least in part on predicting the availability status of the cellular network.

23. The apparatus of claim 22, wherein the instructions to monitor the one or more second conditions are further executable by the processor to cause the apparatus to:
monitor a throughput, a degree of quality of service satisfaction, a channel quality, an occupancy of a physical downlink control channel, interference measurements, a handover procedure, or a combination thereof associated with the cellular network.

24. The apparatus of claim 22, wherein the instructions are further executable by the processor to cause the apparatus to:
input the one or more first conditions, the one or more second conditions, or a combination thereof into one or more algorithms, wherein the one or more algorithms predicts the availability status of at least one of the cellular network, the non-cellular network, or both.

25. An apparatus for wireless communications, comprising:
means for monitoring one or more first conditions pertaining to non-cellular communications between a user equipment (UE) and a non-cellular network while the UE is operating in a dual networking mode for steering, switching, or splitting traffic between the non- cellular network and a cellular network;
means for predicting that the non-cellular network will become unavailable to the UE and a time at which the non-cellular network will become unavailable to the UE based at least in part on at least one of the one or more first conditions; and
means for communicating in accordance with the dual networking mode using at least one of the cellular network, the non-cellular network, or a combination thereof based at least in part on the prediction.

26. A non-transitory computer-readable medium storing code for wireless communications, the code comprising instructions executable by a processor to:
monitor one or more first conditions pertaining to non-cellular communications between a user equipment (UE) and a non-cellular network while the UE is operating in a dual networking mode for steering, switching, or splitting traffic between the non-cellular network and a cellular network;
predict that the non-cellular network will become unavailable to the UE and a time at which the non-cellular network will become unavailable to the UE based at least in part on at least one of the one or more first conditions; and
communicate in accordance with the dual networking mode using at least one of the cellular network, the non-cellular network, or a combination thereof based at least in part on the prediction.

* * * * *